United States Patent
Krishnan et al.

(10) Patent No.: US 9,393,715 B2
(45) Date of Patent: Jul. 19, 2016

(54) COMPOSITE RAILROAD TIES AND METHODS OF PRODUCTION AND USES THEREOF

(71) Applicants: Jagadeesh Krishnan, Westford, MA (US); Jitendra Jain, Edison, NJ (US); Deepak Ravikumar, Piscataway, NJ (US); Devin Patten, Red Bank, NJ (US); John Kuppler, Greenbrook, NJ (US); Kenneth Smith, Flemington, NJ (US); Xudong Hu, Plainsboro, NJ (US)

(72) Inventors: Jagadeesh Krishnan, Westford, MA (US); Jitendra Jain, Edison, NJ (US); Deepak Ravikumar, Piscataway, NJ (US); Devin Patten, Red Bank, NJ (US); John Kuppler, Greenbrook, NJ (US); Kenneth Smith, Flemington, NJ (US); Xudong Hu, Plainsboro, NJ (US)

(73) Assignee: Solidia Technologies, Inc., Piscataway, NJ (US)

( * ) Notice: Subject to any disclaimer, the term of this patent is extended or adjusted under 35 U.S.C. 154(b) by 38 days.

(21) Appl. No.: 14/207,421

(22) Filed: Mar. 12, 2014

(65) Prior Publication Data
US 2014/0263683 A1 Sep. 18, 2014

Related U.S. Application Data

(60) Provisional application No. 61/780,738, filed on Mar. 13, 2013.

(51) Int. Cl.
*E01B 3/46* (2006.01)
*B28B 1/14* (2006.01)
*E01B 3/44* (2006.01)
(Continued)

(52) U.S. Cl.
CPC . *B28B 1/14* (2013.01); *B28B 11/24* (2013.01); *B28B 23/02* (2013.01); *C04B 28/188* (2013.01); *C04B 32/02* (2013.01); *E01B 3/44* (2013.01); *C04B 2111/00413* (2013.01); *Y02P 40/615* (2015.11)

(58) Field of Classification Search
CPC .............. E01B 3/00; E01B 3/28; E01B 3/30; E01B 3/32; E01B 3/34; E01B 3/36; E01B 3/44; E01B 3/46
USPC .................. 238/29, 30, 40, 45, 50, 83–87, 91
See application file for complete search history.

(56) References Cited

U.S. PATENT DOCUMENTS

| 4,436,498 A | 3/1984 | Murray |
| 4,956,321 A | 9/1990 | Barrall |

(Continued)

FOREIGN PATENT DOCUMENTS

| WO | 2009/103885 A2 | 8/2009 |
| WO | 2009/102360 A2 | 1/2010 |

(Continued)

OTHER PUBLICATIONS
PCT/US2014/024987, Int'l Search Report of ISA, Aug. 14, 2014.
(Continued)

*Primary Examiner* — R. J. McCarry, Jr.
(74) *Attorney, Agent, or Firm* — Milstein Zhang & Wu LLC

(57) ABSTRACT

The invention provides novel railroad ties manufactured from novel composite materials that possess excellent physical and performance characteristics matching or exceeding existing concrete RRTs. The RRTs of the invention can be readily produced from widely available, low cost raw materials by a process suitable for large-scale production with improved energy consumption and more desirable carbon footprint and minimal environmental impact.

3 Claims, 10 Drawing Sheets

(51) Int. Cl.
 B28B 11/24 (2006.01)
 B28B 23/02 (2006.01)
 C04B 28/18 (2006.01)
 C04B 32/02 (2006.01)
 C04B 111/00 (2006.01)

(56) References Cited

U.S. PATENT DOCUMENTS

| | | |
|---|---|---|
| 8,114,367 B2 | 2/2012 | Riman et al. |
| 2005/0284339 A1 | 12/2005 | Brunton et al. |
| 2007/0062416 A1 | 3/2007 | Brzuskiewicz et al. |
| 2009/0133361 A1 | 5/2009 | Vera |
| 2009/0143211 A1 | 6/2009 | Riman et al. |
| 2010/0037795 A1* | 2/2010 | Van Belkom ............ E01B 3/44 104/9 |
| 2010/0077691 A1 | 4/2010 | Constantz et al. |
| 2010/0326328 A1 | 12/2010 | Constantz et al. |
| 2011/0067600 A1 | 3/2011 | Constantz et al. |
| 2011/0067605 A1 | 3/2011 | Constantz et al. |
| 2011/0104469 A1 | 5/2011 | Riman et al. |
| 2011/0129407 A1 | 6/2011 | Riman et al. |
| 2011/0182799 A1 | 7/2011 | Riman et al. |
| 2011/0203489 A1 | 8/2011 | Constantz et al. |
| 2011/0290156 A1 | 12/2011 | Constantz et al. |
| 2012/0248215 A1* | 10/2012 | Sadeghi ............ E01B 3/34 238/54 |
| 2012/0312194 A1 | 12/2012 | Riman et al. |
| 2013/0122267 A1* | 5/2013 | Riman ............... C04B 14/043 428/201 |
| 2014/0127450 A1 | 5/2014 | Riman et al. |
| 2014/0127458 A1 | 5/2014 | Riman et al. |
| 2014/0342124 A1 | 11/2014 | Zambrzycki et al. |

FOREIGN PATENT DOCUMENTS

| | | |
|---|---|---|
| WO | 2011/053598 A2 | 5/2011 |
| WO | 2011/090967 A2 | 7/2011 |
| WO | 2012/122031 A2 | 9/2012 |
| WO | 2014/159832 A2 | 10/2014 |
| WO | 2014/160168 A2 | 10/2014 |
| WO | 2014/165252 A2 | 10/2014 |
| WO | 2014/165257 A2 | 10/2014 |
| WO | 2014/197532 A2 | 12/2014 |
| WO | 2014/197545 A2 | 12/2014 |
| WO | 2015/051243 A2 | 4/2015 |

OTHER PUBLICATIONS

PCT/US2014/025278, Int'l Search Report of ISA, Aug. 14, 2014.
PCT/US2014/024996, Int'l Search Report of ISA, Aug. 21, 2014.
PCT/US2014/025958, Int'l Search Report of ISA, Sep. 4, 2014.
PCT/US2014/040816, Int'l Search Report of ISA, Oct. 30, 2014.
PCT/US2014/040789, Int'l Search Report of ISA, Sep. 30, 2014.
PCT/US2014/059024, Int'l Search Report of ISA, Apr. 2. 2015.

* cited by examiner

COMPOSITE RAILROAD TIES AND METHODS OF PRODUCTION AND USES THEREOF

PRIORITY CLAIMS AND RELATED PATENT APPLICATIONS

This application claims the benefit of priority from U.S. Provisional Application Ser. No. 61/780,738 filed on Mar. 13, 2013, the entire content of which is incorporated herein by reference in its entirety.

FIELD OF THE INVENTION

The invention generally relates to railroad ties. More particularly, the invention relates to railroad ties manufactured from novel composite materials through an unconventional production process. These unique railroad ties possess excellent properties and are suitable for a variety of applications in railroad construction and maintenance.

BACKGROUND OF THE INVENTION

Railroad ties (a.k.a. railway ties, crossties, or railway sleepers) are elongated beams typically having uniform and trapezoidal cross-sections used to support railroad tracks. Railroad ties (RRTs) are generally laid perpendicular to the rails to hold the rails upright, to transfer loads to the track ballast and subgrade, and to keep the rails spaced to the correct gauge. A RRT is normally reinforced with steel bars, which are embedded into a RRT to improve its mechanical properties and durability. A RRT generally employs a fastening system for secure attachment with the railroad tracks.

Most RRTs manufactured today are made from conventional concrete. For the most part, existing concrete RRTs are operative and reliable for the intended purposes. Concrete RRTs, however, are not optimal in terms of both economics and environmental impact. Existing production technologies involve large energy consumption and carbon dioxide emission, leading to with unfavorable carbon footprints.

Thus, there is an on-going need for novel materials and production methods for RRTs that meet or exceed the physical and performance characteristics of conventional concrete RRTs while at the same time can be mass-produced at low cost with improved energy consumption and less environmental impact.

SUMMARY OF THE INVENTION

The invention is based in part on the unexpected discovery of novel railroad ties manufactured from novel composite materials that possess excellent physical and performance characteristics matching or exceeding existing concrete RRTs. The RRTs of the invention exhibit excellent weatherability and performance characteristics, including toughness, flexibility, abrasion resistance, and chemical resistance. The RRTs of the invention can be readily produced from widely available, low cost raw materials by a process suitable for large-scale production with less equipment need and improved energy consumption, therefore enjoying desirable carbon footprints with minimal environmental impact.

The raw materials include precursor materials such as particulate calcium silicate (e.g., ground wollastonite) that become bonding elements. A fluid component is also provided as a reaction medium, comprising liquid water and/or water vapor. Carbon dioxide ($CO_2$) is consumed as a reactive species in the production of RRTs, resulting in net sequestration of $CO_2$. Various additives can be used to fine-tune the physical appearance and mechanical properties of the resulting composite material.

In one aspect, the invention generally relates to a railroad tie. The railroad tie has an elongated tie body prepared with a composite material that includes: a plurality of bonding elements, wherein each bonding element comprises a core comprising primarily calcium silicate, a silica-rich first or inner layer, and a calcium carbonate-rich second or outer layer; and filler particles comprising coarse filler particles and/or fine filler particles, wherein the plurality of bonding elements and the plurality of filler particles together form one or more bonding matrices and the bonding elements and the filler particles are substantially evenly dispersed therein and bonded together.

In another aspect, the invention generally relates to a process for producing a railroad tie. The process includes: (a) mixing a particulate composition and a liquid composition to form a slurry mixture, wherein the particulate composition comprises: a ground calcium silicate having a median particle size in the range from about 1 μm to about 100 μm, and filler particles comprising a first coarse aggregate particles and a second fine aggregate particles, and wherein the liquid composition comprises water; (b) casting the slurry mixture in a mold configured for a railroad tie; and (c) curing the casted mixture at a temperature in the range from about 20° C. to about 150° C. for about 1 hour to about 80 hours under an atmosphere of water and $CO_2$ having a pressure in the range from ambient atmospheric pressure to about 60 psi above ambient and having a $CO_2$ concentration ranging from about 10% to about 90%.

DETAILED DESCRIPTION OF THE INVENTION

Figure 1:
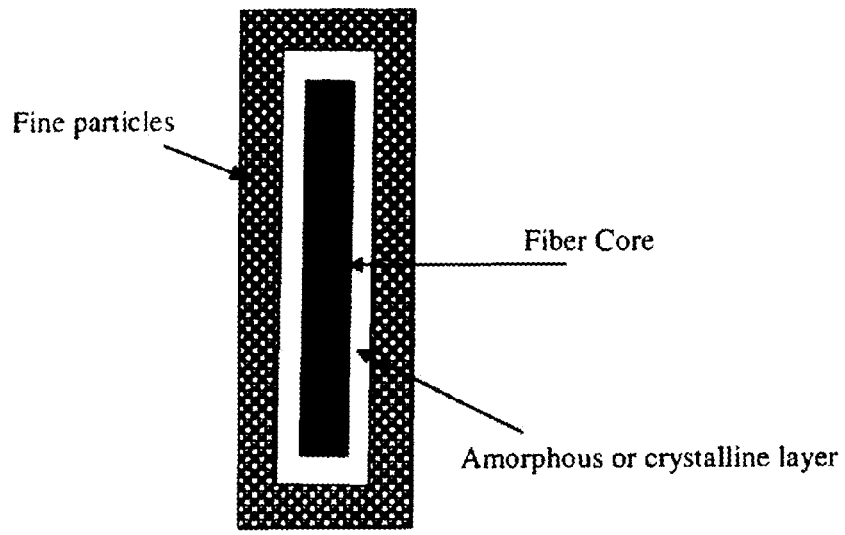
FIGS. 1(a)-1(c) are schematic illustrations of cross-sections of bonding elements according to exemplary embodiments of the present invention, including three exemplary core morphologies: (a) fibrous, (b) elliptical, and (c) equiaxed.
Figure 1:
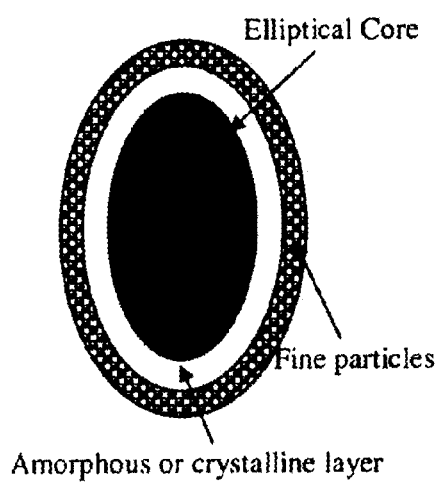
Figure 1:
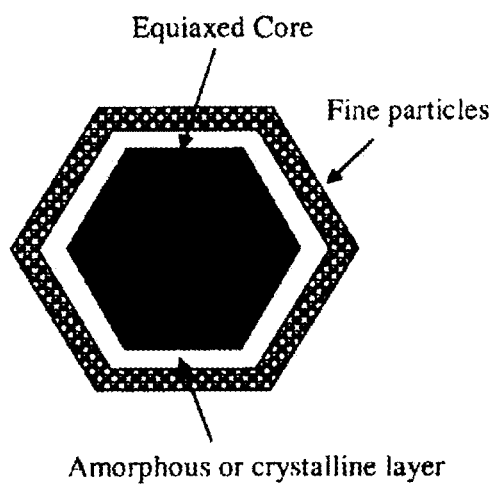

The invention provides exceptional railroad ties possessing excellent physical and performance characteristics matching or exceeding existing concrete RRTs. The RRTs of the invention can be readily produced from widely available, low cost raw materials by a process suitable for large-scale production with improved energy consumption and more desirable carbon footprints.

The RRTs of the invention can be manufactured for use on a variety of railroad tracks, e.g., heavy haul, light rail, turnouts, high speed, and industrial railroad ties for railway track. RRTs may be manufactured pre-tensioned (or post-tensioned) and pre-stressed, features that increase the capacity and durability of the RRTs.

The RRTs of the invention can be produced at large-scales with less equipment needs and improved energy efficiency than the production of convention concrete RRTs. Furthermore, the production method of the invention consumes large quantities of $CO_2$ resulting in a $CO_2$ sequestrated product thereby making it carbon-neutral and environmentally efficient.

The RRTs of the invention and the composite materials used for their production exhibit a low thermal expansion; therefore, they are well suited for maintaining the proper distance between rails. The RRTs of the invention and the composite materials used for their production are strong, stiff, and resistant to ultraviolet light, severe weather conditions, temperature fluctuations, and attack from microorganisms and insects, as well as mechanical stress imposed by extended use. Additionally, the composite material itself is an excellent electric insulator and prevents electrical flow between the rails. Furthermore, the RRTs of the invention and the composite materials used for their production are durable and exhibit excellent abrasion resistance properties while at the same time are suitable for use with typical fasteners, bolts, screws, spikes, etc.

In one aspect, the invention generally relates to a railroad tie. The railroad tie has an elongated tie body prepared with a composite material that includes: a plurality of bonding elements, wherein each bonding element comprises: a core comprising primarily calcium silicate, a silica-rich first or inner layer, and a calcium carbonate-rich second or outer layer; and filler particles comprising coarse filler particles and/or fine filler particles, wherein the plurality of bonding elements and the plurality of filler particles together form one or more bonding matrices and the bonding elements and the filler particles are substantially evenly dispersed therein and bonded together.

In certain preferred embodiments, the elongated tie body has a substantially uniform cross section (e.g., trapezoidal) within one or more longitudinally (lengthwise) disposed ducts (channels) (e.g., 1, 2, 3, 4, 5, 6, 7, 8, 9, 10 ducts) for placement of the one or more reinforcement bars longitudinally therein. In certain preferred embodiments, the RRT further includes one or more reinforcement bars (or rebars) within the tie body (e.g., 1, 2, 3, 4, 5, 6, 7, 8, 9, 10 rebars). The rebars are typically placed longitudinally in the elongated RRT.

In certain preferred embodiments, the one or more reinforcement bars are steel rebars. In certain preferred embodiments, the one or more reinforcement bars are non-steel rebars.

For steel rebars, their interface with the tie body may be sandwiched a protective material having a pH higher than 12 (e.g., a material comprising Portland cement mortar), thereby separating the tie body from direct contact with the steel rebars. In certain preferred embodiments, the protective material is a protective coating on the steel reinforcement bars selected from epoxy and zinc (galvanized steel).

In certain embodiments, the railroad tie is pre-stressed. In certain embodiments, the railroad tie is post-tensioned. In certain preferred embodiments, the railroad tie is pre-stressed and post-tensioned.

As used herein, the term "pre-stressed" refers to rebars or strands stressed to certain level and positioned in RRT mold prior to the placement and curing of concrete in the RRT mold.

As used herein, the term "post-tensioned" refers to rebars or strands stressed to certain level and positioned within the ducts of a fully cured concrete RRT after the fully cured RRT has been removed from the mold Pre-tension can be applied to the tendons before casting of the composite material. Pre-compression can be transmitted from a steel reinforcement bar to the composite material through bonding over the transmission length near the ends of the RRT. Post-tensioning pre-stressed RRT can be applied to the tendons after hardening of the composite material. The pre-compression can also transmitted from a steel reinforcement bar to the composite material by the anchorage device (at the end of the blocks).

In certain preferred embodiments, the composite material of the RRT is characterized by a density from about 1900 $kg/m^3$ to 2800 $kg/m^3$ (e.g., about 2000 $kg/m^3$, about 2200 $kg/m^3$, about 2300 $kg/m^3$, about 2400 $kg/m^3$, about 2500 $kg/m^3$, about 2600 $kg/m^3$, from about 2200 $kg/m^3$ to 2600 $kg/m^3$).

The composite materials of the RRT exhibit excellent compressive strength. In certain embodiments, the composite material is characterized by a compressive strength from about 40 MPa to about 150 MPa (e.g., about 40 MPa to about 120 MPa, about 40 MPa to about 100 MPa, about 50 MPa to about 150 MPa, about 60 MPa to about 120 MPa, about 80 MPa to about 150 MPa, about 100 MPa to about 150 MPa).

The composite materials of the RRT also exhibit excellent flexural strength. In certain embodiments, the composite material is characterized by a flexural strength from about 1 MPa to about 40 MPa (e.g., 1 MPa to about 30 MPa, 1 MPa to about 25 MPa, 1 MPa to about 20 MPa, 1 MPa to about 15 MPa, 3 MPa to about 10 MPa, 4 MPa to about 10 MPa, 4 MPa to about 8 MPa, 6 MPa to about 30 MPa, 15 MPa to about 40 MPa, about 15 MPa to about 35 MPa, about 15 MPa to about 30 MPa, about 15 MPa to about 25 MPa, about 15 MPa to about 20 MPa, about 20 MPa to about 40 MPa, about 20 MPa to about 35 MPa, about 20 MPa to about 30 MPa).

In certain preferred embodiments, the composite material of the RRT is characterized by an improved abrasion resistance compared to conventional concrete railroad ties. In certain preferred embodiments, the composite material of the RRT characterized by an improved corrosion resistance compared to conventional concrete railroad ties. In certain preferred embodiments, the composite material of the RRT characterized by an improved insect resistance compared to conventional concrete railroad ties. In certain preferred embodiments, the composite material of the RRT characterized by an improved electric insulator compared to conventional concrete railroad ties.

Any suitable calcium silicate may be used as a precursor for the bonding elements. As used herein, the term "calcium silicate" refers to naturally-occurring minerals or synthetic materials that are comprised of one or more of a group of calcium-silicon-containing compounds including $CaSiO_3$ (also known as "wollastonite" and sometimes formulated as $CaO.SiO_2$), $Ca_2SiO_4$ (also known as "Belite" and sometimes formulated as $2CaO.SiO_2$), $Ca_3SiO_5$ (also known as "Alite" and sometimes formulated as $3CaO.SiO_2$), which material may include one or more other metal ions and oxides (e.g., aluminum, magnesium, iron or manganese oxides), or blends thereof, or may include an amount of magnesium silicate in naturally-occurring or synthetic form(s) ranging from trace amount (1%) to about 50% or more by weight.

It should be understood that, compositions and methods disclosed herein can be adopted to use magnesium silicate in place of or in addition to calcium silicate. As used herein, the term "magnesium silicate" refers to nationally-occurring minerals or synthetic materials that are comprised of one or more of a groups of magnesium-silicon-containing compounds including, for example, $Mg_2SiO_4$ (also known as "Fosterite") and $Mg_3Si_4O_{10}(OH)_2$ (also known as "Talc"), which material may include one or more other metal ions and oxides (e.g., calcium, aluminum, iron or manganese oxides), or blends thereof, or may include an amount of calcium silicate in naturally-occurring or synthetic form(s) ranging from trace amount (1%) to about 50% or more by weight.

The plurality of bonding elements may have any suitable median particle size and size distribution dependent on the desired composite material. In certain embodiments, the plurality of bonding elements have a median particle size in the range of about 5 μm to about 100 μm (e.g., about 5 μm to about 80 μm, about 5 μm to about 60 μm, about 5 μm to about 50 μm, about 5 μm to about 40 μm, about 5 μm to about 30 μm, about 5 μm to about 20 μm, about 5 μm to about 10 μm, about 10 μm to about 80 μm, about 10 μm to about 70 μm, about 10 μm to about 60 μm, about 10 μm to about 50 μm, about 10 μm to about 40 μm, about 10 μm to about 30 μm, about 10 μm to about 20 μm).

In certain preferred embodiments, the plurality of bonding elements are chemically transformed from ground wollastonite. In certain preferred embodiments, the plurality of bonding elements are chemically transformed from a precursor calcium silicate comprising one or more of aluminum, magnesium and iron. In certain preferred embodiments, the plurality of bonding elements are prepared by chemical transformation from ground wollastonite by reacting it with $CO_2$ via a controlled hydrothermal liquid phase sintering (HLPS) process.

In certain preferred embodiments, wherein the plurality of bonding elements are chemically transformed from a precursor calcium silicate other than wollastonite. In certain preferred embodiments, the plurality of bonding elements are prepared by chemical transformation from the precursor calcium silicate other than wollastonite by reacting it with $CO_2$ via a controlled HLPS process.

Discussions on various aspects of HLPS can be found in U.S. Pat. No. 8,114,367, U.S. Pub. No. US 2011/0104469 (application Ser. No. 12/984,299), U.S. Pub. No. 20090142578 (application Ser. No. 12/271,513), WO 2009/102360 (PCT/US2008/083606), WO 2011/053598 (PCT/US2010/054146), WO 2011/090967 (PCT/US2011/021623), U.S. application Ser. No. 13/411,218 filed Mar. 2, 2012 (Riman et al.), U.S. application Ser. No. 13/491,098 filed Jun. 7, 2012 (Riman et al), and Provisional U.S. Appl. Ser. No. 61/708,423 filed Oct. 1, 2012 (Riman et al), each of which is expressly incorporated herein by reference in its entirety for all purposes.

Any suitable filler particles may be used, for example, filler particles made from a silicon dioxide-rich material. In certain preferred embodiments, the filler particles are made from one or more of $SiO_2$-based or silicate-based material such as quartz, mica, granite, and feldspar (e.g., ground quartz, ground mica, ground granite, ground feldspar). The term "quartz", as used herein, refers to any $SiO_2$-based material, including common sands (construction and masonry), as well as glass and recycled glass. The term also includes any other recycled natural and synthetic materials that contain significant amounts of $SiO_2$ (e.g., mica sometimes formulated as $KAl_2(AlSi_3O_{10})$).

The filler particles may have any suitable median particle size and size distribution. In certain embodiments, the plurality of filler particles has a median particle size in the range from about 10 μm to about 1 mm (e.g., about 10 μm to about 500 μm, about 10 μm to about 250 μm, about 10 μm to about 100 μm, about 10 μm to about 50 μm, about 20 μm to about 1 mm, about 20 μm to about 500 μm, about 20 μm to about 300 μm, about 50 μm to about 1 mm, about 100 μm to about 1 mm, about 200 μm to about 1 mm).

In certain preferred embodiments, the composite material has a weight ratio of bonding elements:filler particles is from about 1:3 to about 1:10 (e.g., about 1:4, about 1:5, about 1:6, about 1:7). In certain embodiments, the composite material has less than about 10% by weight of one or more minerals selected from calcium carbonate and magnesium carbonate.

In certain embodiments, the composite material is characterized by water absorption of less than about 10% (e.g., less than about 8%, 5%, 4%, 3%, 2%, 1%).

The composite material may further include an additive to modify the physical or mechanical properties of the RRTs. Exemplary additives include rheology modifying admixtures and air entraining agents.

In certain embodiments, the elongated tie body has one or more longitudinally disposed ducts.

In certain embodiments, the railroad tie further includes one or more reinforcement bars placed respectively in the one or more longitudinally disposed ducts.

In certain embodiments, the one or more reinforcement bars are steel bars.

In certain embodiments, the one or more reinforcement bars are non-steel bars.

In certain embodiments, the steel reinforcement bars interface with the tie body via a protective material having a pH higher than about 12.

In certain embodiments, the protective material comprises Portland cement mortar grouted in the ducts.

In certain embodiments, the protective material is a protective coating on the steel reinforcement bars selected from epoxy and zinc.

In certain embodiments, the railroad tie is pre-stressed.

In certain embodiments, the railroad tie is post-tensioned.

In certain embodiments, the composite material is characterized by a density from about 1900 $kg/m^3$ to 2800 $kg/m^3$, a compressive strength from about 40 MPa to about 100 MPa, and a flexural strength from about 4 MPa to about 10 MPa.

In certain embodiments, the railroad tie exhibits an improved abrasion resistance over conventional concrete railroad ties and characterized by an abrasion index greater than 350 min/inch.

In certain embodiments, the railroad tie exhibits an improved corrosion resistance over conventional concrete railroad ties and characterized by a half-cell potential values are less than −350 for up to 100 days of wetting and drying exposure.

In certain embodiments, the plurality of bonding elements have a median particle size in the range from about 5 μm to about 100 μm.

In certain embodiments, the filler particles are made from a silicon dioxide-rich material.

In certain embodiments, the filler particles include one or more of sand, quartz, and granite.

In certain embodiments, the plurality of bonding elements are chemically transformed from ground wollastonite.

In certain embodiments, the plurality of bonding elements are prepared by chemical transformation from ground wollastonite by reacting it with $CO_2$ via a controlled hydrothermal liquid phase sintering process.

In certain embodiments, the plurality of bonding elements are chemically transformed from a precursor calcium silicate other than wollastonite.

In certain embodiments, the plurality of bonding elements are prepared by chemical transformation from the precursor calcium silicate other than wollastonite by reacting it with $CO_2$ via a controlled hydrothermal liquid phase sintering process.

In certain embodiments, the plurality of bonding elements are chemically transformed from a precursor calcium silicate comprising one or more of aluminum, magnesium and iron.

In certain embodiments, the weight ratio of bonding elements:filler particles is about 1:5.

In certain embodiments, the railroad tie has water absorption of less than about 10%.

In another aspect, the invention generally relates to a process for producing a railroad tie. The process includes: (a) mixing a particulate composition and a liquid composition to form a slurry mixture, wherein the particulate composition comprises: a ground calcium silicate having a median particle size in the range from about 1 μm to about 100 μm, and filler particles comprising a first coarse aggregate particles and a second fine aggregate particles, and wherein the liquid composition comprises water; (b) casting the slurry mixture in a mold configured for a railroad tie; and (c) curing the casted mixture at a temperature in the range from about 20° C. to about 150° C. for about 1 hour to about 80 hours under an atmosphere of water and $CO_2$ having a pressure in the range from ambient atmospheric pressure to about 60 psi above ambient and having a $CO_2$ concentration ranging from about 10% to about 90%.

In certain embodiments, the liquid composition further includes a high-range water-reducing admixture. In certain embodiments, the liquid composition further includes an air entraining agent.

The mold can be configured for one or more ducts allowing placement of reinforcement bars. The process can further include (d) placing reinforcement bars through the ducts; and (e) filling the ducts with a protective material having a pH higher than about 12.

In certain embodiments, ground calcium silicate may account for about 16 wt. % of the particulate composition. In certain embodiments, the ground calcium silicate can be primarily ground wollastonite.

Any suitable high-range water-reducing admixtures may be used, for example, a polycarboxylate-based material. Any suitable concentration or amount may be used, for example at a concentration from about 1.5 wt. % to about 3 wt. % (e.g., about 1.5 wt. %, about 2.0 wt. %, about 2.5 wt. %, about 3.0 wt. %) of the liquid composition.

In certain embodiments, curing the casted mixture is performed at a temperature in the range from about 40° C. to about 120° C. for about 5 hours to about 72 hours under a vapor comprising water and $CO_2$ and having a pressure in the range from about ambient atmospheric pressure to about 30 psi above ambient atmospheric pressure.

In certain embodiments, curing the casted mixture is performed at a temperature in the range from about 60° C. to about 110° C. for about 15 hours to about 72 hours under a vapor comprising water and $CO_2$ and having a pressure in the range from about ambient atmospheric pressure to about 30 psi above ambient atmospheric pressure.

In certain embodiments, curing the casted mixture is performed at a temperature in the range from about 80° C. to about 100° C. for about 20 hours to about 60 hours under a vapor comprising water and $CO_2$ and having a pressure in the range from about ambient atmospheric pressure to about 30 psi above ambient atmospheric pressure.

In certain embodiments, curing the casted mixture is performed at a temperature equal to or lower than about 60° C. for about 15 to about 50 hours under a vapor comprising water and $CO_2$ and having an ambient atmospheric pressure.

The relative humidity environment of the curing process may be adjusted to fit the desired outcome, for example, ranging from about 50% to about 98% (e.g., from about 60% to about 98%, from about 70% to about 98%, from about 80% to about 98%, from about 90% to about 98%, from about 50% to about 90%, from about 50% to about 80%, from about 50% to about 70%) and with a $CO_2$ pressure ranging from about ambient atmospheric pressure to about 100 psi above ambient atmospheric pressure (e.g., from about ambient atmospheric pressure to about 90 psi above ambient, from about ambient atmospheric pressure to about 80 psi above ambient, from about ambient atmospheric pressure to about 70 psi above ambient, from about ambient atmospheric pressure to about 60 psi above ambient, from about 20 above ambient to about 100 psi above ambient, from about 30 above ambient to about 100 psi above ambient), and having a $CO_2$ concentration ranging from about 10% to about 90% (e.g., from about 20% to about 90%, from about 30% to about 90%, from about 40% to about 90%, from about 10% to about 70%, from about 10% to about 50%) to produce an aerated composite material exhibiting a uniform, homogeneous, and highly porous structure.

The ground calcium silicate having a median particle size in the range from about 1 μm to about 100 μm, and a first ground calcium carbonate having a median particle size in the range from about 3 μm to about 7 mm. The liquid composition includes water and a water-soluble dispersant.

For example, in some embodiments, the ground wollastonite has a median particle size from about 5 μm to about 50 μm (e.g., about 5 μm, 10 μm, 15 μm, 20 μm, 25 μm, 30 μm, 40 μm, 90 μm), a bulk density from about 0.6 g/mL to about 0.8 g/mL (loose) and about 1.0 g/mL to about 1.2 g/mL (tapped), a surface area from about 1.5 m²/g to about 2.0 m²/g. The first ground limestone has a median particle size from about 40 μm to about 90 μm (e.g., about 40 μm, 50 μm, 60 μm, 70 μm, 80 μm, 30 μm, 90 μm), a bulk density from about 0.7 g/mL to about 0.9 g/mL (loose) and about 1.3 g/mL to about 1.6 g/mL (tapped). The second ground limestone has a median particle size from about 20 μm to about 60 μm (e.g., about 20 μm, 30 μm, 40 μm, 50 μm, 60 μm), a bulk density from about 0.6 g/mL to about 0.8 g/mL (loose) and about 1.1 g/mL to about 1.4 g/mL (tapped).

In certain preferred embodiments, the ground calcium silicate comprises ground wollastonite, the particulate calcium oxide comprises ground lime, and the aerating agent comprises aluminum powder.

Any suitable precursor materials may be employed. For example calcium silicate particles formed primarily of wollastonite, $CaSiO_3$, can react with carbon dioxide dissolved in water. It is believed that calcium cations are leached from the wollastonite and transform the peripheral portion of the wollastonite core into calcium-deficient wollastonite. As the calcium cations continue to be leached from the peripheral portion of the core, the structure of the peripheral portion eventually become unstable and breaks down, thereby transforming the calcium-deficient wollastonite peripheral portion of the core into a predominantly silica-rich first layer. Meanwhile, a predominantly calcium carbonate second layer precipitates from the water.

More specifically, the first layer and second layer may be formed from the precursor particle according the following reaction (1):

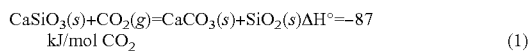

$$CaSiO_3(s)+CO_2(g)=CaCO_3(s)+SiO_2(s)\Delta H°=-87 \text{ kJ/mol } CO_2 \quad (1)$$

For example, in a silicate mineral carbonation reaction such as with wollastonite, $CO_2$ is introduced as a gas phase that dissolves into an infiltration fluid, such as water. The dissolution of $CO_2$ forms acidic carbonic species that results in a decrease of pH in solution. The weakly acidic solution incongruently dissolves calcium species from $CaSiO_3$. The released calcium cations and the dissociated carbonate species lead to the precipitation of insoluble carbonates. Silica-rich layers are thought to remain on the mineral particles as depletion layers.

Thus, according to a preferred embodiment of the invention, $CO_2$ preferentially reacts with the calcium cations of the wollastonite precursor core, thereby transforming the peripheral portion of the precursor core into a silica-rich first layer and a calcium carbonate-rich second layer. Also, the presence of the first and second layers on the core act as a barrier to further reaction between wollastonite and carbon dioxide, resulting in the bonding element having the core, first layer and second layer.

Preferably, gas-assisted HLPS processes utilize partially infiltrated pore space so as to enable gaseous diffusion to rapidly infiltrate the porous preform and saturate thin liquid interfacial solvent films in the pores with dissolved $CO_2$. $CO_2$-based species have low solubility in pure water (1.5 g/L at 25° C., 1 atm.). Thus, a substantial quantity of $CO_2$ must be continuously supplied to and distributed throughout the porous preform to enable significant carbonate conversion. Utilizing gas phase diffusion offers a huge (about 100-fold) increase in diffusion length over that of diffusing soluble $CO_2$ an equivalent time in a liquid phase. ("Handbook of chemistry and physics", Editor: D. R. Lide, Chapters 6 and 8, $87^{th}$ Edition 2006-2007, CRC.) This partially infiltrated state enables the reaction to proceed to a high degree of carbonation in a fixed period of time.

Liquid water in the pores speeds up the reaction rate because it is essential for ionization of both carbonic acid and calcium species. However, water levels need to be low enough such that $CO_2$ gas can diffuse into the porous matrix prior to dissolution in the pore-bound water phase. Furthermore, the actively dissolving porous preform serves as a template for expansive reactive crystal growth. Thus, the bonding element and matrices can be formed with minimal distortion and residual stresses. This enables large and complex shapes to result, such as those needed for infrastructure and building materials, in addition to many other applications.

Thus, various combinations of curing conditions may be devised to achieve the desired production process, including varied reaction temperatures, pressures and lengths of reaction. In a first exemplary embodiment, water is delivered to the precursor materials in liquid form with $CO_2$ dissolved therein and the curing process is conducted at about 90° C. and about 20 psig (i.e., 20 psi above ambient pressure) for about 48 hours. In a second exemplary embodiment, water is present in the precursor material (e.g., as residual water from prior mixing step) and water vapor is provided to precursor materials (e.g., to maintain water level and/or prevent loss of water from evaporating) along with $CO_2$ and the curing process is performed at about 60° C. and 0 psig (at ambient atmospheric pressure) for about 19 hours. In a third exemplary embodiment, water is delivered to precursor materials in vapor form along with $CO_2$ and the curing process is performed at about 90° C. and 20 psig (20 psi above ambient atmospheric pressure) for about 19 hours.

In an exemplary embodiment, the manufacturing process of RRTs is summarized as follows. The required quantities of calcium silicate (e.g., synthetic wollastonite), sand, coarse aggregates, water and chemical admixtures are calculated based on the batch size. These ingredients are mixed in the concrete mixer (e.g., for about 5 to 10 minutes). The mixture is poured slowly into a mold kept on vibrating table and compacted well using mechanical vibration so as to get smooth finish on the top. The sides of the mold are removed after 1 to 2 hours of casting. The specimen is moved to curing/reaction chamber where temperature increased from room temperature (~20° C.) to 60° C. in 1 hour and kept at that temperature for about 60 hours at a relative humidity of 60%. At the same time $CO_2$ is pumped in at ambient atmospheric pressure with concentration of 90% to produce a composite material exhibiting a uniform, homogeneous, and highly dense matrix.

In certain embodiments, the mold is configured for one or more ducts allowing placement of reinforcement bars.

In certain embodiments, the process further includes: placing reinforcement bars through the ducts; and filling the ducts with a protective material having a pH higher than about 12.

In certain embodiments, the protective material comprises Portland cement mortar.

In certain embodiments, curing the casted mixture is performed at a temperature in the range from about 60° C. to about 110° C. for about 15 hours to about 70 hours under a vapor comprising water and $CO_2$ and having a pressure in the range from about ambient atmospheric pressure to about 30 psi above ambient atmospheric pressure.

In certain embodiments, curing the casted mixture is performed at a temperature in the range from about 60° C. to about 100° C. for about 20 hours to about 60 hours under a vapor comprising water and $CO_2$ and having a pressure in the range from about ambient atmospheric pressure to about 30 psi above ambient atmospheric pressure.

In certain embodiments, curing the casted mixture is performed at a temperature equal to or lower than about 60° C. for about 15 to about 50 hours under a vapor comprising water and $CO_2$ and having an ambient atmospheric pressure.

In certain embodiments, the ground calcium silicate comprises ground wollastonite, and filler particles comprise coarse particles and fine particles of a silicon dioxide-rich material.

In certain embodiments, filler particles comprising coarse particles and fine particles comprise one or more of sand, quartz, and granite.

In certain embodiments, the high-range water-reducing admixture comprising a polycarboxylate and having a concentration from about 1.5 wt. % to about 3 wt. % of the liquid composition.

In certain embodiments, the particulate composition comprises about 16 wt. % of ground calcium silicate.

In certain embodiments, the ground calcium silicate is primarily ground wollastonite.

In yet another aspect, the invention generally relates to a railroad tie prepared by a process disclosed herein. In certain embodiments, the railroad tie exhibits a density from about 1900 kg/m$^3$ to 2800 kg/m$^3$, a compressive strength from about 40 MPa to about 100 MPa, and a flexural strength from about 4 MPa to about 10 MPa. In certain embodiments, the railroad tie is characterized by an improved abrasion resistance over conventional concrete railroad ties. In certain embodiments, the railroad tie is characterized by an improved corrosion resistance over conventional concrete railroad ties.

The RRTs may be prepared to meet or exceed the specifications of certain industry standards. For pre-stressed RRTs of the invention, for example, compressive strength can be greater than about 10,000 psi, abrasion index values can be greater than 590 min/inch (per ASTM C779 procedure C), and the durability can be greater than 95% after 300 freeze thaw cycles (per ASTM C666 procedure A).

The sizes, shapes, numbers and dimensions of the ducts, cut, surfacing all may be varied according to the particular needs. For example, in the U.S., the standard railroad tie has a size for main rail lines at about 9 in. wide by 7 in. thick by approximately 8.5 ft. long. For short lines, the size of the ties is about 6 in. by 8 in. by 8.5 ft. For some freight and passenger lines in which a third rail is used, the ties can be 7 in. by 9 in. by 10 ft. or 6 in. by 8 in. by 10 ft.

In conventional pre-stressed concrete ties, the cement hydration is main reaction for strength gain in poured concrete around the pre-stressing tendons. Calcium-Silicate-Hydrate (C—S—H) gel and calcium hydroxide are the major hydration products. C—S—H gel is the most important phase for strength development and microstructure. Once initial compressive strength of about 4000 psi is achieved the tendons are released or cut from the ends to induce stresses in concrete.

In RRT production according to the present invention, the curing or the reaction process involves the use of consuming $CO_2$ resulting in $CO_2$ sequestrated product thereby making it very carbon neutral and environmentally efficient technology.

A major concern for RRTs is corrosion of steel or pre-stressing strands. In case of post-tensioned concrete tie, the ducts are generally laid out and grouted and carbon steel are coated with Portland cement mortar, resulting in much lower HCP values ~−250 mV indicating no corrosion activity. Therefore, application of post-tensioned RRT's according to the present invention are protected and are not susceptible to corrosion as much as conventional concrete RRTs.

Compositions and methods disclosed herein in connection with calcium silicate can be adopted to use magnesium silicate in place of or in addition to calcium silicate.

Bonding Elements, Bonding Matrices and Composite Materials

A. Bonding Elements

As schematically illustrated in FIGS. 1(a)-1(c), a bonding element includes a core (represented by the black inner portion), a first layer (represented by the white middle portion) and a second or encapsulating layer (represented by the outer portion). The first layer may include only one layer or multiple sub-layers and may completely or partially cover the core. The first layer may exist in a crystalline phase, an amorphous phase or a mixture thereof, and may be in a continuous phase or as discrete particles. The second layer may include only one layer or multiple sub-layers and may also completely or partially cover the first layer. The second layer may include a plurality of particles or may be of a continuous phase, with minimal discrete particles.

A bonding element may exhibit any size and any regular or irregular, solid or hollow morphology depending on the intended application. Exemplary morphologies include: cubes, cuboids, prisms, discs, pyramids, polyhedrons or multifaceted particles, cylinders, spheres, cones, rings, tubes, crescents, needles, fibers, filaments, flakes, spheres, subspheres, beads, grapes, granulars, oblongs, rods, ripples, etc.

In general, as discussed in greater detail herein, a bonding element is produced from reactive precursor materials (e.g., precursor particles) through a transformation process. The precursor particles may have any size and shape as long as they meet the needs of the intended application. The transformation process generally leads to the corresponding bonding elements having similar sizes and shapes of the precursor particles.

Precursor particles can be selected from any suitable material that can undergo suitable transformation to form the desired bonding elements. For example, the precursor particles may include oxides and non-oxides of silicon, titanium, aluminum, phosphorus, vanadium, tungsten, molybdenum, gallium, manganese, zirconium, germanium, copper, niobium, cobalt, lead, iron, indium, arsenic, tantalum, and/or alkaline earth elements (beryllium, magnesium, calcium, strontium, barium and radium).

Exemplary precursor materials include oxides such as silicates, titanates, aluminates, phosphates, vanadates, tungstates, molybdates, gallates, manganates, zirconates, germinates, cuprates, stannates, hafnates, chromates, niobates, cobaltates, plumbates, ferrites, indates, arsenates, tantalates and combinations thereof. In some embodiments, the precursor particles include silicates such as orthosilicates, sorosilicates, cyclosilicates, inosilicates, phyllosilicates, tectosilicates and/or calcium silicate hydrate.

Certain waste materials may be used as the precursor particles for some applications. Waste materials may include, for example, minerals, industrial waste, or an industrial chemical material. Some exemplary waste materials include mineral silicate, iron ore, periclase, gypsum, iron (II) huydroxide, fly ash, bottom ash, slag, glass, oil shells, red mud, battery waste, recycled concrete, mine tailings, paper ash, or salts from concentrated reverse osmosis brine.

Additional precursor particles may include different types of rock containing minerals such as cal-silicate rock, (itch formation, hebron gneiss, layered gneiss, middle member, argillite, quartzite, intermediate Precambrian sediments, dark-colored, feldpathic quartzite with minor limestone beds, high-grade metasedimentry biotite schist, biotite gniss, mica schist, quartzite, hoosac formation, partridge formation, Washington gneiss, Devonian, Silurian greenvale cove formation, ocoee supergroup, metasandstone, metagraywacke, Rangeley formation, amphibolites, calcitic and dolomite marble, manhattan formation, rusty and gray biotite-quartz-feldspar gneiss, and waterford group.

Precursor particles may also include igneous rocks such as, andesite, anorthosite, basinite, boninite, carbonatite and charnockite, sedimentary materials such as, but not limited to, argillite, arkose, breccias, cataclasite, chalk, claystone, chert, flint, gitsone, lighine, limestone, mudstone, sandstone, shale, and siltsone, metamorphic materials such as, but not limited to, amphibolites, epidiorite, gneiss, granulite, greenstone, hornfels, marble, pelite, phyllite, quartzite, shist, skarn, slate, talc carbonate, and soapstone, and other varieties of rocks such as, but not limited to, adamellite, appinite, aphanites, borolanite, blue granite, epidosite, felsites, flint, ganister, ijolite, jadeitite, jasproid, kenyte, vogesite, larvikite, litchfieldite, luxullianite, mangerite, minette, novaculite, pyrolite, rapakivi granite, rhomb porphyry, shonkinite, taconite, teschenite, theralite, and variolite.

Table 1 provides exemplary embodiments of different types of chemistries for the first and second layers that can be achieved when using different precursor materials. Regarding the first layer, by using different precursor materials one may obtain silica, alumina or titania. The second layer may also be modified with the selection of the precursor material. For example, the second layer may include various types of carbonates such as, pure carbonates, multiple cations carbonates, carbonates with water or an OH group, layered carbonates with either water or an OH group, anion containing carbonates, silicate containing carbonates, and carbonate-bearing minerals.

TABLE 1

Exemplary Precursors and Encapsulating layers

| Raw Material (Precursor) | First Layer | Encapsulating Layer |
|---|---|---|
| Wollastonite ($CaSiO_3$) | Silica-rich | $CaCO_3$ |
| Fosterite ($Mg_2SiO_4$) | | $MgCO_3$ |
| Diopside ($CaMgSi_2O_6$) | | $(Ca,Mg)CO_3$ |
| Talc ($Mg_3Si_4O_{10}(OH)_2$) | | $MgCO_3 \cdot xH_2O$ (x = 1-5) |
| Glaucophane | Alumina | $MgCO_3$ and/or |
| ($Na_2Mg_3Al_2Si_8O_{22}(OH)_2$) | and/or | $NaAlCO_3(OH)_2$ |
| Palygorskite | Silica- | $Mg_6Al_2CO_3(OH)_{16}4H_2O$ |
| (($Mg,Al)_2Si_4O_{10}(OH) \cdot 4(H_2O)$) | rich | |
| Meionite | | $Ca_2SO_4CO_3 \cdot 4H_2O$ |
| ($Ca_4(Al_2Si_2O_8)_3(Cl_2CO_3,SO_4)$) | | |
| Tanzanite | | $Ca_5Si_2O_8CO_3$ and/or |
| ($Ca_2Al_3O(SiO_4)(Si_2O_7)(OH)$) | | $Ca_5Si_2O_8CO_3$ and/or |
| | | $Ca_7Si_6O_{18}CO_3 \cdot 2H_2O$ |
| ($Ba_{0.6}Sr_{0.3}Ca_{0.1}$)$TiO_3$ | Titania-rich | $Sr(Sr,Ca,Ba)(CO_3)_2$ |

The second layer may be modified by introducing additional anions and/or cations. Such additional anions and cations may be used to modify the second layer to increase its physical and chemical properties such as fire resistance or acid resistance. For example, as shown in Table 2, while the first layer is retained as a silica-rich layer, the second layer may be modified by adding extra anions or cations to the reaction, such as $PO_4^{2-}$ and $SO_4^{2-}$. As a result, the second layer may include, for example, different phosphate, sulphate, fluoride or combinations thereof.

TABLE 2

Examples of Cation/Anion Sources (in addition to $CO_3^{2-}$)

| Core Particle | First Layer | Extra anion/cation source | Encapsulating Layer | Carbonate Type |
|---|---|---|---|---|
| $CaSiO_3$ | Silica-rich layer | Phosphates | $Ca_5(PO_4,CO_3)_3OH$ | Phosphate bearing carbonates |
| | | Sulphates | $Ca_2SO_4CO_3 \cdot 4H_2O$ | Sulphate bearing carbonates |
| | | Fluorides | $Ca_2CO_3F_2$ | Fluorides bearing carbonates |
| | | Phosphates and fluorides | $Ca_5(PO_4,CO_3)_3F$ | Fluoride and phosphates bearing carbonates |
| | | $Mg^{+2}$ source like chlorides, nitrates, hydroxides etc. | $CaMg(CO_3)_2$ | Multiple cation carbonates |
| | | A combination of cation and anion sources | $Ca_6Mg_2(SO_4)_2(CO_3)_2Cl_4(OH)4 \cdot 7H_2O$ | Post-1992 Carbonate-Bearing Minerals |

B. Bonding Matrix and Composite Material

A bonding matrix comprises a plurality of bonding elements, forming a three-dimensional network. The bonding matrix may be porous or non-porous. The degree of porosity depends on a number of variables that can be used to control porosity, such as temperature, reactor design, the precursor material and the amount of liquid that is introduced during the transformation process. Depending on the intended application, the porosity can be set to almost any degree of porosity from about 1 vol. % to about 99 vol. %.

The bonding matrix may incorporate one or more filler materials, which are mixed with the precursor materials prior to or during the transformation process to create the composite material. The concentration of bonding elements in the bonding matrix may vary. For example, the concentration of bonding elements on a volume basis may be relatively high, wherein at least some of the bonding elements are in contact with one another. This situation may arise if filler material is incorporated into the bonding matrix, but the type of filler material and/or the amount of filler material is such that the level of volumetric dilution of the bonding element is relatively low. In another example, the concentration of bonding elements on a volume basis may be relatively low, wherein the bonding elements are more widely dispersed within the bonding matrix such that few, if any of the bonding elements are in contact with one another. This situation may arise if filler material is incorporated into the bonding matrix, and the type of filler material and/or the amount of filler material is such that the level of dilution is relatively high.

In general, the filler material may include any one of a number of types of materials that can be incorporated into the bonding matrix. A filler material may be inert or active. An inert material does not go through any chemical reaction during the transformation and does not act as a nucleation site, although it may physically or mechanically interact with the bonding matrix. The inert material may involve polymers, metals, inorganic particles, aggregates, and the like. Specific examples may include, but are not limited to basalt, granite, recycled PVC, rubber, metal particles, alumina particle, zirconia particles, carbon-particles, carpet particles, Kevlar™ particles and combinations thereof. An active material chemically reacts with the bonding matrix during the transformation go through any chemical reaction during the transformation and/or acts as a nucleation site. For example, magnesium hydroxide may be used as a filler material and may chemically react with a dissolving calcium component phase from the bonding matrix to form magnesium calcium carbonate.

The bonding matrix may occupy almost any percentage of a composite material. Thus, for example, the bonding matrix may occupy about 1 vol. % to about 99 vol. % of the composite material (e.g., the volume fraction of the bonding matrix can be less than or equal to about 90 vol. %, 70 vol. %, 50 vol. %, 40 vol. %, 30 vol. %, 20 vol. %, 10 vol. %). A preferred range for the volume fraction of the bonding matrix is about 8 vol. % to about 90 vol. % (e.g., about 8 vol. % to about 80 vol. %, about 8 vol. % to about 70 vol. %, about 8 vol. % to about 50 vol. %, about 8 vol. % to about 40 vol. %), and more preferred range of about 8 vol. % to 30 vol. %.

A composite material may also be porous or non-porous. The degree of porosity depends on a number of variables that can be used to control porosity, such as temperature, reactor design, the precursor material, the amount of liquid that is introduced during the transformation process and whether any filler is employed. Depending on the intended application, the porosity can be set to almost any degree of porosity from about 1 vol. % to about 99 vol. % (e.g., less than or equal to about 90 vol. %, 70 vol. %, 50 vol. %, 40 vol. %, 30 vol. %, 20 vol. %, 10 vol. %). A preferred range of porosity for the composite material is about 1 vol. % to about 70 vol. %, more preferably between about 1 vol. % and about 10 vol. % for high density and durability and between about 50 vol. % and about 70 vol. % for lightweight and low thermal conductivity.

Figure 2:
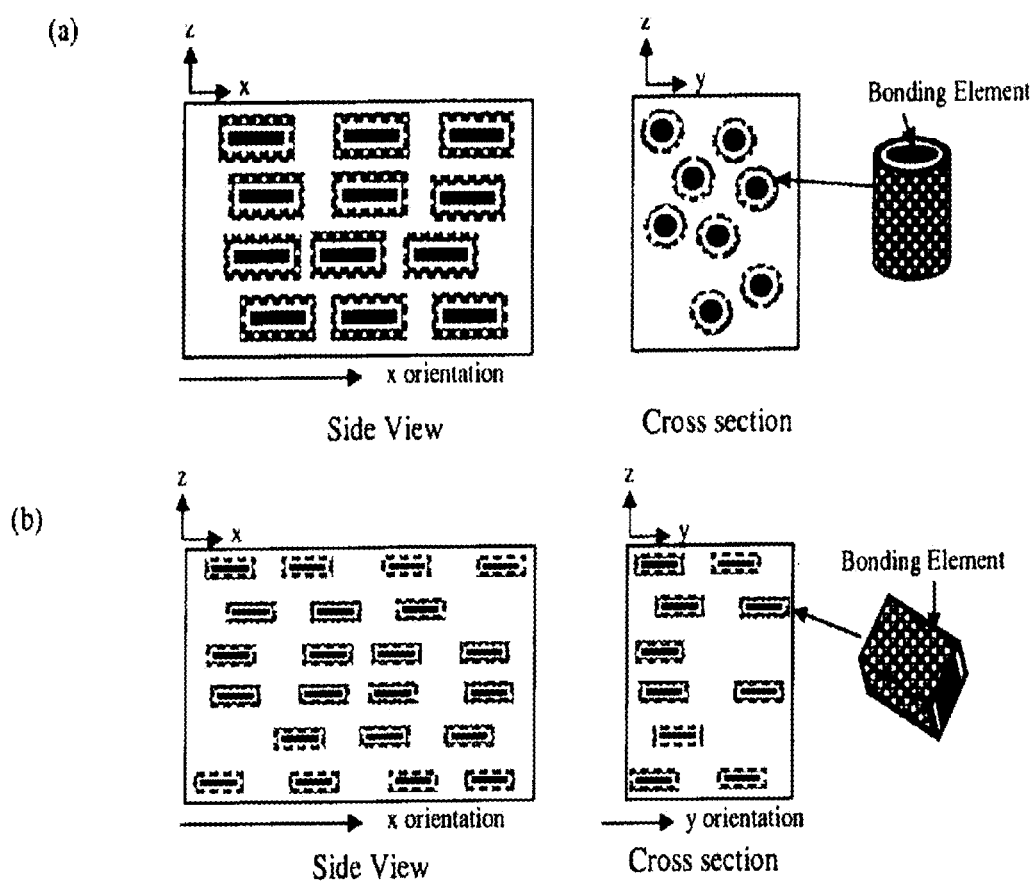
FIGS. 2(a)-2(f) are schematic illustrations of side view and cross section views of composite materials according to exemplary embodiments of the present invention, illustrating (a) 1D oriented fiber-shaped bonding elements in a dilute bonding matrix (bonding elements are not touching), (b) 2D oriented platelet shaped bonding elements in a dilute bonding matrix (bonding elements are not touching), (c) 3D oriented platelet shaped bonding elements in a dilute bonding matrix (bonding elements are not touching), and (d) randomly oriented platelet shaped bonding elements in a dilute bonding matrix (bonding elements are not touching), wherein the composite materials includes the bonding matrix and filler components such as polymers, metals, inorganic particles, aggregates etc., (e) a concentrated bonding matrix (with a volume fraction sufficient to establish a percolation network) of bonding elements where the matrix is 3D oriented, and (f) a concentrated bonding matrix (with a volume fraction sufficient to establish a percolation network) of randomly oriented bonding elements, wherein filler components such as polymers, metals, inorganic particles, aggregates etc. may be included.
Figure 2:
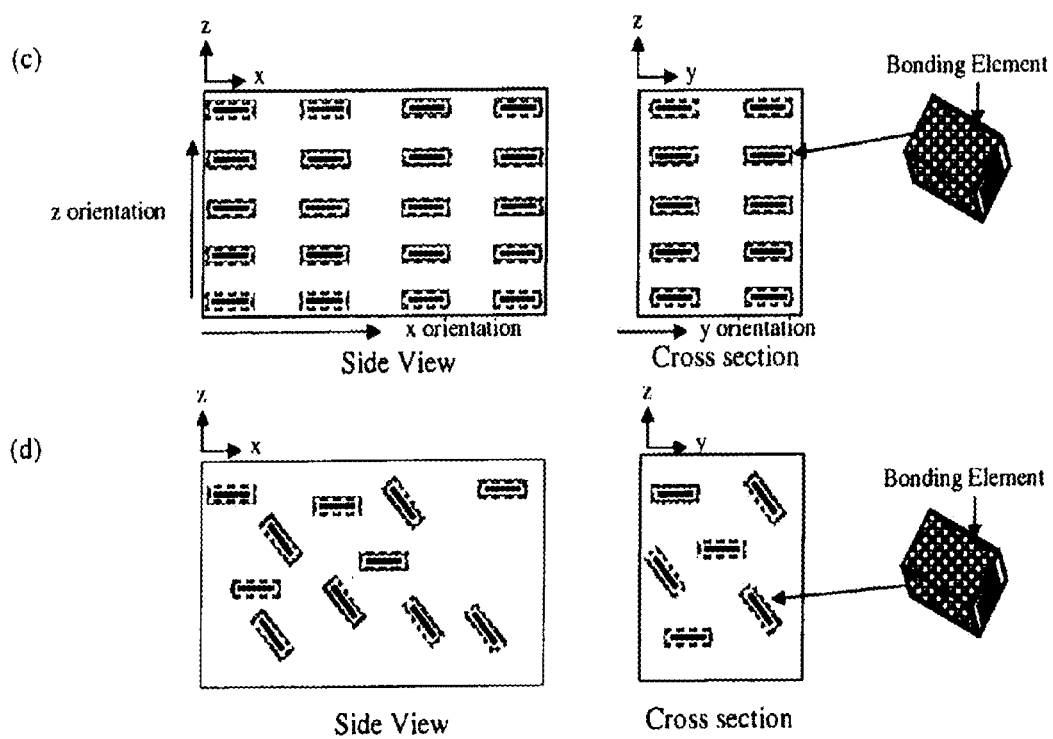
Figure 2:
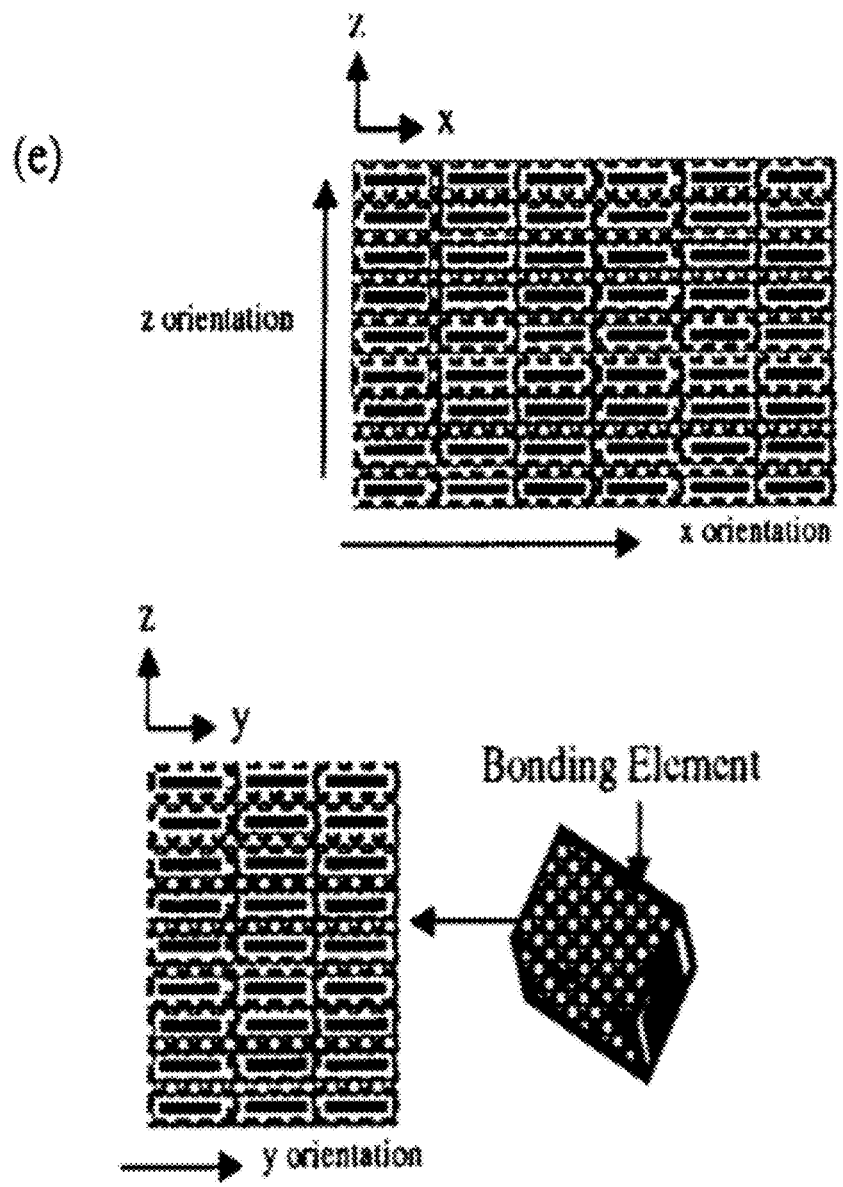
Figure 2:
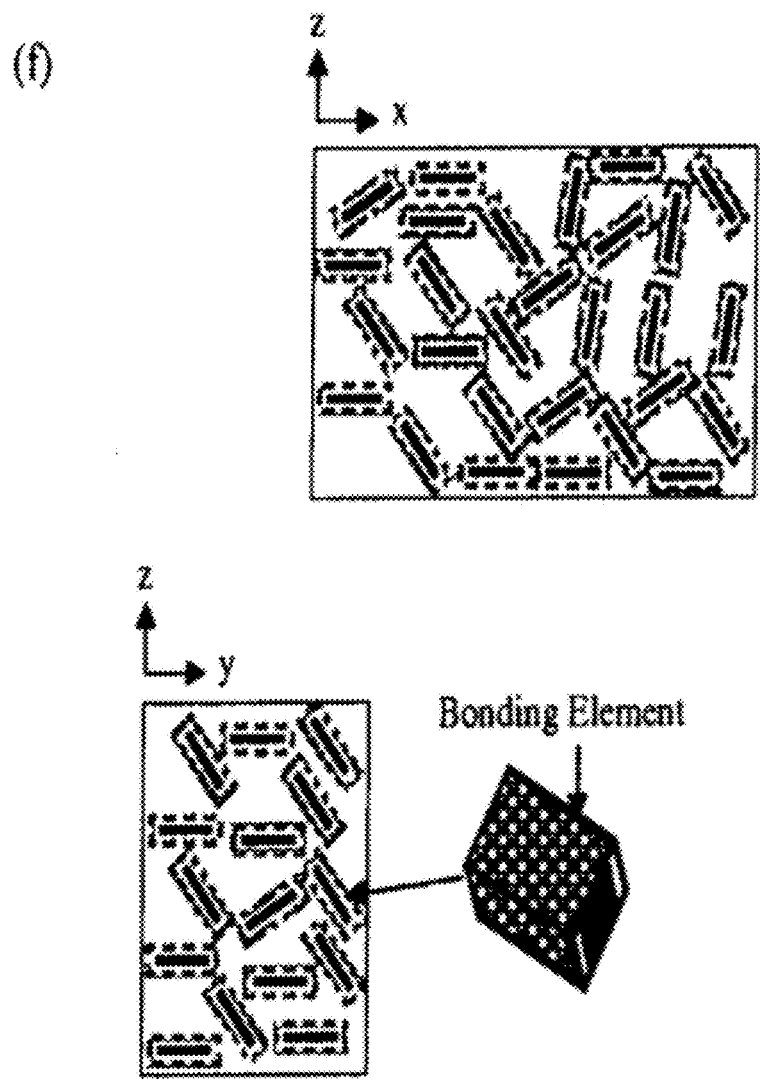

Within the bonding matrix, the bonding elements may be positioned, relative to each other, in any one of a number of orientations. FIGS. 2(a)-2(f) schematically illustrate an exemplary bonding matrix that includes fiber- or platelet-shaped bonding elements in different orientations possibly diluted by the incorporation of filler material, as represented by the spacing between the bonding elements. FIG. 2(a), for example, illustrates a bonding matrix that includes fiber-shaped bonding elements aligned in a one-direction ("1-D") orientation (e.g., aligned with respect to the x direction). FIG. 2(b) illustrates a bonding matrix that includes platelet-shaped bonding elements aligned in a two-direction ("2-D") orientation (e.g., aligned with respect to the x and y directions). FIG. 2(c) illustrates a bonding matrix that includes platelet-shaped bonding elements aligned in a three-direction ("3-D") orientation (e.g., aligned with respect to the x, y and z directions). FIG. 2(d) illustrates a bonding matrix that includes platelet-shaped bonding elements in a random orientation, wherein the bonding elements are not aligned with respect to any particular direction. FIG. 2(e) illustrates a bonding matrix that includes a relatively high concentration of platelet-shaped bonding elements that are aligned in a 3-D orientation. FIG. 2(f) illustrates a bonding matrix that includes a relatively low concentration of platelet-shaped bonding elements that are situated in a random orientation (a percolation network). The composite material of FIG. 2(f) achieves the percolation threshold because a large proportion of the bonding elements are touching one another such that a continuous network of contacts are formed from one end of the material to the other end. The percolation threshold is the critical concentration above which bonding elements show long-range connectivity with either an ordered, e.g., FIG. 2(e), or random orientation, e.g., FIG. 2(f), of bonding elements. Examples of connectivity patterns can be found in, for example, Newnham, et al., "Connectivity and piezoelectric-pyroelectric composites", Mat. Res. Bull. vol. 13, pp. 525-536, 1978).

Furthermore, one or multi-level repeating hierarchic structure can be achieved in a manner that can promote dense packing, which provides for making a strong material, among other potential useful, functional purposes. Hierarchy describes how structures form patterns on several length scales. Different types of bonding matrices can be created by varying the matrix porosity and by incorporating core fibers of different sizes. Different kinds of particulate and fiber components can be used with hierarchic structures to fabricate different kinds of structures with different connectivity.

Processes of Forming the Bonding Elements, Bonding Matrices and Composite Materials The transformation (curing) process proceeds by exposing the precursor material to a reactive liquid. A reactant associated with the liquid reacts with the chemical ingredients that make up the precursor particles, and more specifically, the chemical reactants in the peripheral portion of the precursor particles. This reaction eventually results in the formation of the first and second layers.

In some embodiments, the precursor particles include two or more chemical elements. During the transformation process, the reactant in the liquid preferentially reacts with at least a first one of the chemical elements, wherein the reaction between the reactant in the liquid (e.g., $CO_2$ and related species in solution) and the at least one first chemical element (e.g., $calcium^{2+}$) results in the formation of the first and second layers, the first layer comprising a derivative of the precursor particle, generally excluding the at least one first chemical element, whereas the second layer comprises a combination (e.g., $CaCO_3$) of the reactant and the at least one first chemical element. In comparison, the core comprises the same or nearly the same chemical composition as the precursor particle (e.g., $CaSiO_3$). For example, peripheral portions of the core may vary from the chemical composition of the precursor particle due to selective leaching of particular chemical elements from the core.

Thus, the core and the second layer share the at least one first chemical element (e.g., $calcium^{2+}$) of the precursor particle, and the core and the first layer share at least another one of the chemical elements of the precursor particle (e.g., $Si^{4+}$). The at least one first chemical element shared by the core and the second layer may be, for example, at least one alkaline earth element (beryllium, magnesium, calcium, strontium, barium and radium). The at least another one of the chemical elements shared by the core and the first layer may be, for example, silicon, titanium, aluminum, phosphorus, vanadium, tungsten, molybdenum, gallium, manganese, zirconium, germanium, copper, niobium, cobalt, lead, iron, indium, arsenic and/or tantalum.

In some embodiments, the reaction between the reactant in the liquid phase and the at least one first chemical element of the precursor particles may be carried out to completion thus resulting in the first layer becoming the core of the bonding element and having a chemical composition that is different from that of the precursor particles, and at least one additional or second shell layer comprising a composition that may or may not include the at least one first chemical element of the two or more chemical elements of the precursor particles.

A. Gas-Assisted Hydrothermal Liquid Phase Sintering

The bonding elements may be formed, for example, by a method based on gas-assisted HLPS. In such a method, a porous solid body including a plurality of precursor particles is exposed to a liquid (solvent), which partially saturates the pores of the porous solid body, meaning that the volume of the pores are partially filled with water.

In certain systems such as those forming carbonate, completely filling the pores with water is believed to be undesirable because the reactive gas is unable to diffuse from the outer surface of the porous solid body to all of the internal pores by gaseous diffusion. Instead, the reactant of the reactive gas would dissolve in the liquid and diffuse in the liquid phase from the outer surface to the internal pores, which is much slower. This liquid-phase diffusion may be suitable for transforming thin porous solid bodies but would be unsuitable for thicker porous solid bodies.

In some embodiments, a gas containing a reactant is introduced into the partially saturated pores of the porous solid body and the reactant is dissolved by the solvent. The dissolved reactant then reacts with the at least first chemical element in the precursor particle to transform the peripheral portion of the precursor particle into the first layer and the second layer. As a result of the reaction, the dissolved reactant is depleted from the solvent. Meanwhile, the gas containing the reactant continues to be introduced into the partially saturated pores to supply additional reactant to the solvent.

As the reaction between the reactant and the at least first chemical element of the precursor particles progresses, the peripheral portion of the precursor particle is transformed into the first layer and the second layer. The presence of the first layer at the periphery of the core eventually hinders further reaction by separating the reactant and the at least first chemical element of the precursor particle, thereby causing the reaction to effectively stop, leaving a bonding element having the core as the unreacted center of the precursor particle, the first layer at a periphery of the core, and a second layer on the first layer.

The resulting bonding element includes the core, the first layer and the second layer, and is generally larger in size than the precursor particle, filling in the surrounding porous regions of the porous solid body and possibly bonding with adjacent materials in the porous solid body. As a result, net-shape formation of products may be formed that have substantially the same size and shape as but a higher density than the porous solid body. This is an advantage over traditionally sintering processes that cause shrinkage from mass transport to produce a higher density material than the initial powder compact.

B. HLPS in an Autoclave

In an exemplary embodiment of the method of HLPS, a porous solid body comprising a plurality of precursor particles is placed in an autoclave chamber and heated. Water as a solvent is introduced into the pores of the porous solid body by vaporizing the water in the chamber. A cooling plate above the porous solid body condenses the evaporated water that then drips onto the porous body and into the pore of the porous solid body, thus partially saturating the pores of the porous solid body. However, the method of introducing water in this example is one of several ways that water can be delivered. For example, the water can also be heated and sprayed.

Meanwhile, carbon dioxide as a reactant is pumped into the chamber, and the carbon dioxide diffuses into the partially saturated pores of the porous body. Once in the pores, the carbon dioxide dissolves in the water, thus allowing the reaction between the precursor particles and the carbon dioxide to transform the peripheral portions of the precursor particles into the first and second layers.

As the reaction between the second reactant and the first layer progresses, the second reactant continues to react with the first layer, transforming the peripheral portion of the first layer into the second layer. The formation of the second layer may be by the exo-solution of a component in the first layer, and such a second layer may be a gradient layer, wherein the concentration of one of the chemical elements (cations) making up the second layer varies from high to low as you move from the core particle surface to the end of the first layer. It is also possible that the second layer can be a gradient composition as well, such as when the layers are either amorphous or made up of solid solutions that have either constant or varying compositions.

The presence of the second layer at the periphery the precursor core eventually hinders further reaction by separating the second reactant and the first layer, causing the reaction to effectively stop, leaving a bonding element having the core, the first layer at a periphery of the core and a second layer on the first layer. The resulting bonding element is generally larger in size than the original precursor particle, thereby filling in the surrounding porous regions of the porous solid body and bonding with adjacent materials of the porous solid body. As a result, the method allows for net-shape formation of products having substantially the same shape as but a higher density than the original porous solid body. This is an advantage over traditional sintering processes that cause shrinkage from mass transport to produce a higher density material than the initial powder compact.

C. Infiltration Medium

The infiltration medium used for transportation into at least a portion of the porous matrix includes a solvent (e.g., water) and a reactive species (e.g., $CO_2$). The solvent can be aqueous or non-aqueous. The solvent can include one or more components. For example, in some embodiments, the solvent can be water and ethanol, ethanol and toluene, or mixtures of various ionic liquids, such as ionic liquids based on alkyl-substituted imidazolium and pyridinium cations, with halide or trihalogenoaluminate anions. Wetting systems are preferred over non-wetting in order to simplify processing equipment.

The solvent should not be chemically reactive with the porous matrix, although the solvent may chemically react with reactive species. The solvent can be removed via a variety of separation methods such as bulk flow, evaporation, sublimation or dissolution with a washing medium, or any other suitable separation method known to one of ordinary skill in the art.

More specifically, the solvent is a liquid at the temperature where the dissolved reactive species react with the porous matrix. This temperature will vary depending on the specific solvent and reactive species chosen. Low temperatures are preferred over higher ones to save energy and simplify processing equipment thereby reducing manufacturing costs.

The role of the solvent contrasts with prior art involving reactive systems, such as, for example, Portland cement, where a solvent such as water reacts with a porous matrix to form products that contain solvent molecules, such as metal hydrates or metal hydroxides, among other precipitation products.

Regardless of the phase of the pure reactive species, the reactive species dissolve in the solvent as neutral, anionic or cationic species. For example, the at least one reactive species can be $CO_2$, which is a gas at room temperature that can dissolve in water as neutral $CO_2$ but can create reactive species such as $H_3O^+$, $HCO_3^-$, $H_2CO_3$ and $CO_3^{2-}$. Regardless of the initial phase of the reactive species and the solvent in the natural state, the infiltration medium is in a liquid phases in the pores (e.g., interstitial spaces) of a porous matrix.

For example, capillary forces can be used to wick the infiltration medium into a porous matrix spontaneously. This type of wetting occurs when the infiltration medium has a very low contact angle (e.g., <90° C.). In this case, the medium can partially fill (partially saturate) or fully fill (saturate) the pores. The infiltration can also take place in such a manner that the some pores are filled while others are empty and/or partially filled. It is also possible that an infiltrated porous matrix with gradients in pore filling or saturation can be later transformed to one that is uniform via capillary flow. In addition, wetting does not spontaneously occur when the contact angle of the infiltration medium is high (e.g., >90°). In such cases, fluids will not infiltrate the porous matrix unless external pressure is applied. This approach has utility when it is desirable to withdraw the infiltration medium by the release of pressure (e.g., a reaction can be initiated or halted by pressure).

When infiltration is done using spontaneous capillary flow in the pores, the bulk flow ceases when the pores are filled (saturated). During HLPS, the reactive species react with the matrix to form one or more products by the various reactions. The at least one reaction species is depleted from inside the pore space and thus need to be replenished during the course of the reaction. When pores are fully saturated with the infiltration medium, the reactive species must be transported from the infiltration medium external to the porous matrix through the matrix pores. In a quiescent fluid, diffusion is the process by which transport takes place. Thus, for some HLPS methods whose reactions inside the pores are fast relative to all other mass transport processes, the reaction becomes limited by large increases in the porous matrix thickness. In such a case, only the outer portion of the matrix reacts extensively with the reactive species, while inner regions of the porous matrix are either less completely reacted or unreacted. These types of reactions are suitable for preparation of gradient microstructures where the concentrations of products of the HLPS process are higher on the outside portion (near external surface regions) versus the interior of the structure.

D. Process Selection and Control

When highly exothermic reactions proceed slowly relative to transport of the infiltration medium and the matrix is thermally insulating, entrapped heat can increase the rate of reaction in the interior of the matrix to enable its interior to contain more product phase (i.e., the product of the reaction between the at least one reactive species and a portion of the porous matrix) than its interior. For HLPS processes where reactions isothermally proceed at an intermediate rate relative to mass transport of the infiltration medium, diffusion can continue to supply the pores with reactive species and no gradient in the degree of reaction (or product concentration) will be observed. In such a case, there is little difference in the chemical and/or phase composition from the interior to the exterior of the material of the monolithic structure or body.

In many cases, a uniform microstructure with respect to phase and composition is desirable in the monolithic structure body. Furthermore, it is also desirable to conduct HLPS reactions in a relatively short time frame, for example, where large thick monolithic bodies are required for applications such as for roads or bridges. It is desirable to balance the rate of reaction and mass transport for HLPS processes. The strategy for precursor choice and method of introducing the precursors to comprise the infiltration medium is important. The preferred choice of precursors and method of introducing the infiltration medium is at least in part a function of the sample thickness in the thinnest direction, the time scale considered acceptable for the process and the thermodynamic and kinetic constraints needed for the process to be commercially viable, such as temperature, pressure and composition.

Table 3 summarizes the precursor choice and method of introduction strategies. The porous matrix can be directly infiltrated or the porous matrix may be evacuated prior to any of the infiltration sequences described in the Table 3. Methods are described that use gases as precursors, liquids as precursors or solids as precursors. In addition, phase mixtures such as solid and liquids, gases and liquids and gas and solids can all be used. For example, a reactant such as $CO_2$ is a gas in its pure state but is converted to a solution species dissolved into water. Such an event can come about by gaseous diffusion into the porous matrix and subsequent condensation when a pore is encountered. This type of precursor system is relevant when microstructures having carbonate phases are desired. The order of addition of the precursors (solvent and reactive species) can influence the reaction yield and microstructure of the material.

TABLE 3

Precursors and Methods of Introduction for HLPS Processes

| System | Reactive Species | Solvent | Deliquescent Material | Methods of Introduction |
|---|---|---|---|---|
| (1) | Gas | Gas | | Premixing (parallel introduction) two gases and introducing them to a lower temperature to condense one or more gas species in the matrix to comprise an infiltrating solution containing reactive species and solvent or condense the gas mixture in the matrix by cooling the matrix or utilize a porous matrix that possesses Kelvin pores to condense the gas phase in the matrix. Gases can also be introduced in series where one gas is condensed prior to infiltration or after infiltration and the other is introduced afterwards to dissolve in the liquid phase. The reverse order is possible but the reaction yield could be reduced. |
| (2) | Gas | Gas | Solid | Pre-mixing deliquescent solid with matrix, pre-mix gases (parallel introduction) then flow and/or diffuse the gas mixture through the matrix to form infiltrating solution Gases can be introduced in series into the deliquescent solid-matrix pre-mixture. The preferred order is to have the gas that liquefies the deliquescent solid and then the gas that dissolves to form reactive species. The reverse order is acceptable but the reaction yield could be reduced |
| (3) | Gas | Liquid | Solid | Premixing of deliquescent solid with matrix, then infiltrate with liquid solvent, then add gas (or visa-versa) to form infiltrating |

TABLE 3-continued

Precursors and Methods of Introduction for HLPS Processes

| System | Reactive Species | Solvent | Deliquescent Material | Methods of Introduction |
|---|---|---|---|---|
| | | | | solution in matrix pores. Reverse order of gas and liquid is possible but may result in reduced reaction yield<br>or<br>Gas and liquid could be pre-mixed as a solution for introduction into the deliquescent solid-matrix pre-mixture but reaction yield might be reduced |
| (4) | Liquid | Liquid | | Pre-mix (parallel introduction) fluids then infiltrate matrix.<br>or<br>Infiltrate fluids through matrix in series with preferred ordering being liquid solvent prior to liquid that provides reactive species. |
| (5) | Liquid | Liquid | Solid | Premixing of deliquescent solid with matrix, then add liquid solvent to dissolve deliquescent solid, then add liquid reactive species (or visa-versa) to form infiltrating solution.<br>or<br>Pre-mixed solvent and reactive species in liquid phases as an infiltration solution for introduction into the deliquescent solid-matrix pre-mixture |
| (6) | Liquid | Gas | | Infiltrate matrix with gas and condense in matrix as liquid, then infiltrate second liquid into matrix to mix with first liquid in matrix. Reverse order is also possible but not preferred due to possibility of low reaction yield.<br>or<br>Preferred route is premixing of gas and liquid by condensing gas and mixing into second liquid, then introduce solution to a porous matrix |
| (7) | Gas | Liquid | — | Infiltrate liquid then introduce gas or Pre-dissolve gas in liquid then infiltrate |
| (8) | Solid | Solid | | Mix solids with porous matrix, then pressurize or heat to form infiltration liquid. One solid may flux the other to form a liquid phase that can be removed later by washing. Other solids could be added to reduce melting temperature to form liquid phase as long as it can be removed later |
| (9) | Liquid | Solid | | Prepare infiltration solution by dissolving solid in liquid, then infiltrate<br>Or<br>Premix solid with porous matrix, then infiltrate with liquid |
| (10) | Solid | Liquid | | Prepare infiltration solution by dissolving solid in liquid, then infiltrate<br>Or<br>Premix solid with porous matrix, then infiltrate with liquid |

In some embodiments, the solvent and reactive species may be premixed to form the infiltration medium and then introduced into the matrix in a single step. In other embodiments, it may be preferable to employ multiple infiltration sequences. For example, the solvent precursor could be introduced first followed by infiltration of the reactive species or vice versa.

Neither the solvent nor the reactive species precursors need to be the same phase initially as the infiltrating medium will be a liquid that is found in the pores of the matrix. For example, the solvent precursor can be a vapor such as water, which is gaseous at temperatures at 100° C. or higher at atmospheric pressure and can be condensed to a liquid by cooling the matrix to a temperature lower than 100° C. or utilizing surface energy by using porous matrices with pore sizes in the Kelvin pore-size range (less than 100 nm). When the pores are large, the temperature is elevated such that gaseous species cannot be thermally condensed, small amounts of infiltrating solution are needed or other reasons not discussed here, and it may be desirable to form the liquid in the pore using a deliquescent compound. Examples of such compounds include boric acid, iron nitrate, and potassium hydroxide. In this case, a vapor such as water can convert the deliquescent solid phase in the pore to a liquid and crystal growth of the product phase can proceed in the pore. This is particularly useful when liquid infiltration and diffusion limits the thickness of the product made by HLPS. Alternatively, gaseous diffusion can be used to transport species over much large distances to form the infiltration medium required for HLPS inside of the pores of the matrix.

Various additives can be incorporated to improve the HLPS process and the resulting products. Additives can be solids, liquids or gases in their pure state but either soluble in the solvent phase or co-processed (e.g., pre-mixed) with the porous matrix prior to incorporation of the infiltration medium. Examples include nucleation catalysts, nucleation inhibition agents, solvent conditioners (e.g., water softening agents), wetting agents, non-wetting agents, cement or concrete additives, additives for building materials, crystal morphology control additives, crystal growth catalysts, additives that slow down crystal growth, pH buffers, ionic strength adjusters, dispersants, binders, rheological control agents, reaction rate catalysts, electrostatic, steric, electrosteric, polyelectrolyte and Vold-layer dispersants, capping agents, coupling agents and other surface-adsorptive species, acid or base pH modifiers, additives generating gas, liquids or solids (e.g., when heated, pressurized, depressurized, reacted with another species or exposed to any processing variable no listed here), and biological or synthetic components (e.g., serving any of the above functions and/or as a solvent, reactive species or porous matrix).

In some embodiments, a deliquescent solid may be used. The deliquescent solid may be premixed with the porous matrix. Then pre-mixture of the solvent and at least one reactive species can be introduced to the deliquescent solid-porous matrix. The solvent and at least one reactive species in the pre-mixture can be both in the gaseous phase or both in liquid phases. In some embodiments, the solvent may be a liquid and the at least one reactive species may be in a gaseous phase in the pre-mixture or vice versa.

A gas-water vapor stream can be passed over a deliquescent salt in the porous matrix to generate the infiltrating medium in a liquid phase in the interstitial space in the porous matrix. For example, a humid gas-water vapor stream can serve as a solvent for $CO_2$ dissolution and ionization. A large number of salts are known to be deliquescent and can be used suitable for forming liquid solutions from the flow of humid air over the salt surfaces. Selection of the appropriate salt relies on the level of humidity in the air. Some salts can operate at very low relative humidities. Examples of deliquescent slats include $Mg(NO_3)_2$, $CaCl_2$ and $NaCl$.

Regarding delivery of the infiltration medium, it can be delivered as a bulk solution that spontaneously wets the porous matrix. There are many options for delivery of this solution. First, the porous matrix can be immersed in the liquid. Second the infiltration solution can be sprayed onto the porous matrix. In a quiescent system, when there is a volume of infiltration solution that is greater than the pore volume of the porous matrix, diffusion propagates the reaction by delivering the reactive species to the pore sites.

Alternatively, the fluid can flow (mechanically convected) through the porous matrix by a variety of methods. Methods such as pressurized flow, drying, electro-osmotic flow, magneto-osmosis flow, and temperature- and chemical-gradient-driven flow can be used to flow the liquid infiltration medium through the porous body. This dynamic flow allows fresh reactant to be near the porous matrix, as opposed to relying on diffusional processes. This approach is beneficial as long as the pore size distribution of the matrix permits a reasonably high flow rate of a fluid that supplies reactive species faster than a diffusional process and is optimal when the supply rate equals or exceeds the reaction rate for product formation. In addition, flow-through of the infiltration medium is especially useful for highly exothermic reactions. This is particularly beneficial for monolithic structures that are thick and can generate heat internally capable of generating internal pressures capable of fracturing the monolithic structure.

There are many applications where thicknesses of materials exceed this length scale. In these cases, mechanical convection of the fluid by any suitable means known to one of skill in the art is preferred. An alternative is to introduce the solvent or reactive species as a gaseous species. Also, supercritical conditions can be employed to achieve transport rates that lie between liquids and gases. Gas species may be mechanically convected by applying a pressure gradient across the porous matrix. If the gas is a reactive species, pores filled with solvent fluid can flow out of the pores leaving behind a film of solvent on the pores that can absorb the reactive species gas. Alternatively, partially filled pores will allow gas to flow through the pores as the solvent absorbs a portion of the gas flowing through.

A system may utilize low temperatures and low pressures to enable a low cost process. Thus, processes that retain a fraction of solvent in the pores to facilitate gaseous diffusion of reactive species are preferred over those that utilize quiescent fluids for reactions where a large fraction of product is desired. There are many apparatus designs that can effectively transport reactant and solvent species to the pores. Some of these designs involve conventional reactor equipment such as filter presses, spray chambers, autoclaves and steamers.

EXAMPLES

Example 1

Process for Producing Post-Tensioned Railroad Ties with Synthetic Wollastonite

The concrete mixture proportion used for producing these specimens is shown in Table 4.

Raw Materials:

Synthetic Wollastonite (SC-C2), Donghai Golden Resources Industries, Donghai, China, Sieved construction sand, Stavola Construction Materials, Bound Brook, N.J., ¼" and ⅜" aggregate crushed trap rock from Clayton Block company, Lakewood, N.J., Glenium7500 admixture from BASF, and regular tap water.

TABLE 4

| Mixing Proportions (for 450 kg batch size) | | |
|---|---|---|
| Ingredients | Wt. % | Amount (kg) |
| SC-C2 | 16% | 68.35 |
| Sieved Construction sand | 30% | 128.15 |
| 1/4" aggregate | 25% | 106.80 |
| 3/8" aggregate | 29% | 123.90 |
| Total of Solid Components | 94.93% | 427.20 |
| Tap water | 5.07% | 22.80 |
| Glenium7500 | | 0.50 |
| Total of Liquid Components | 5.07% | 23.30 |
| Total of Solid and Liquid | 100% | 450.50 |

Figure 4:
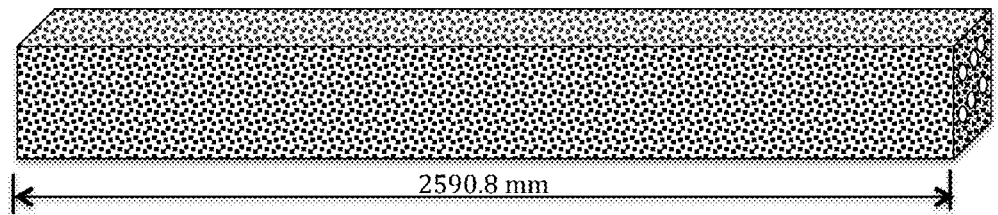
FIG. 4 schematically illustrates a cross-section of an exemplary railroad tie (without reinforcing bar) according to an embodiment of the invention.
Figure 5:
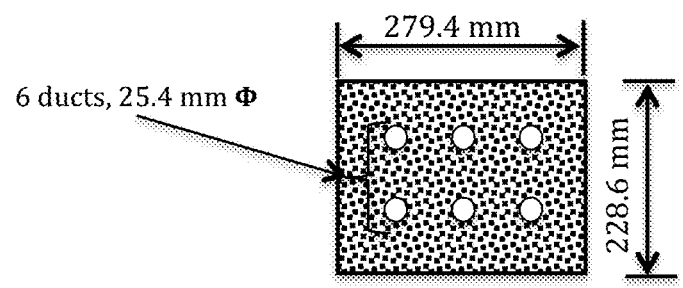
FIG. 5 is photograph of an arrangement to cast RRT with ducts for post-tensioned strands

FIGS. 4 and 5 indicate the longitudinal and cross-sectional view of RRT specimen prepared according to an exemplary embodiment of the invention, respectively. The ducts for posttensioning strands are 1 inch ("in.", 25.4 mm) in diameter.

Mixing Procedure for RRT

1) Measure and load 106.8 kg of ¼ in. aggregates into the hoist of the Sicoma™ planetary mixer (MP 375/250).

2) Measure and load 123.8 kg of ⅜ in. aggregates into the hoist of the mixer.

3) Measure and load 68.5 kg of SC-C2 into the hoist of the mixer.

4) Measure and load 128.1 kg of sieved construction sand into the hoist of the mixer.

5) Mix all these ingredients in the mixer with arms rotating at 40 RPM for 3 minutes to create a dry mix.

6) Measure and load 227.9 kg of tap water and 0.5 kg of Glenium 7500 directly to the dry mix and mix for an additional 3 minutes to create a wet mix.

Casting Procedure for RRT

1) Lubircate the inner surfaces of mold (102 in.×11 in.×9 in.) using WD-40 to enable easy removal of the sides of the form and easy demolding of the cast specimen.

2) Pour the wet mix into a container and transport it to the vibrating table on which mold is kept.

Figure 3:
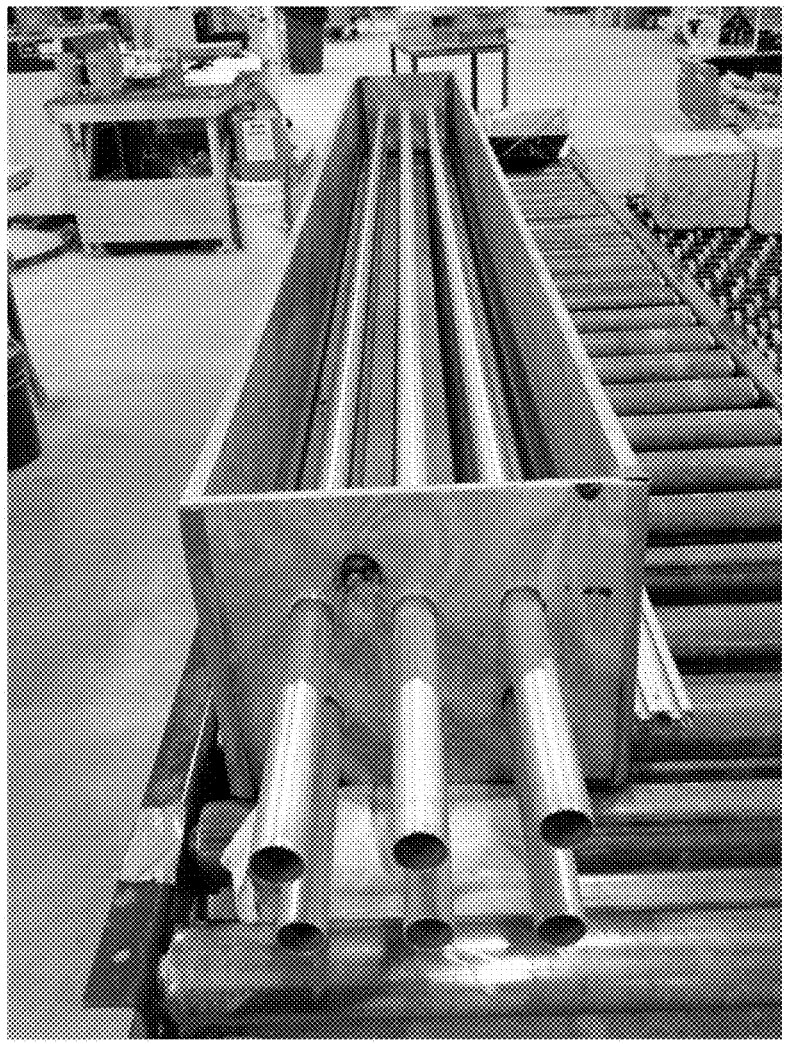
FIG. 3 schematically illustrates an exemplary railroad tie according to an embodiment of the invention.

3) Six ducts for post-tensioned reinforcing steel are created by evenly positioning steel pipes of 1-inch diameter within the mold, as shown in FIG. 3.

4) The wet mix is slowly added to the mold with vibration on. The mold is filled in 4 layers with each layer being vibrated for 5 minutes.

5) After final layer is placed in mold the vibration is continued until very smooth finishing surface is obtained.

6) The mold is kept at room temperature (23±2° C.) for 3 hours. The pipes positioned to form the ducts are removed. Subsequently all 4 vertical sides of the mold are removed to expose the green ceramic body.

Curing Procedure—Steaming at 60° C. And 0 Psig, Atmospheric Pressure

The green ceramic body was placed inside a 7 ft. diameter, 12 ft. long, horizontal, autoclave, which had been pre-heated to 60° C. The autoclave was then purged with $CO_2$ gas heated to 60° C. Bleed-valves at the top and bottom of the autoclave were left in the open position to facilitate $CO_2$ gas flow through the autoclave. During the $CO_2$ purge, a fan was used to stir the environment within the autoclave. After 5 min., the $CO_2$ gas flow was terminated, the two bleed-valves were shut, and the fan was turned off. The bleed-valve at the top of the autoclave was then opened and the $CO_2$ gas flow was resumed for an additional 10 min. This allowed the lighter air to escape through the top bleed-valve and created a near 100% $CO_2$ atmosphere within the autoclave. The bleed-valve at the top of the autoclave was then closed, the fan was turned on, and the $CO_2$ pressure within the autoclave was regulated to 0.5 psig. Water, preheated to 60° C., was circulated at the bottom of the reactor to allow for water vapor pressure to build within the autoclave. Once the atmosphere within the autoclave reaches 60° C., the gas concentrations are approximately 84% $CO_2$ and 16% $H_2O$ vapor. The green ceramic body was cured under these conditions for 65 hours. The cured ceramic body was removed from the autoclave and placed in an industrial dying oven at 90° C. to remove any residual water. The extent of the reaction was calculated based on the weight gain during the reaction. The cured ceramic bodies exhibited an extent of reaction of at least 50%.

Specimens cut from the cured ceramic body were tested for compression and abrasion.

Figure 6:
FIG. 6 shows an actual RRT in fully cured form with six duct holes of 1" diameter for post tensioned strands.

FIG. 6 shows actual RRT specimen cast and cured as per procedure described earlier.

Testing of Corrosion Resistance

Figure 7:
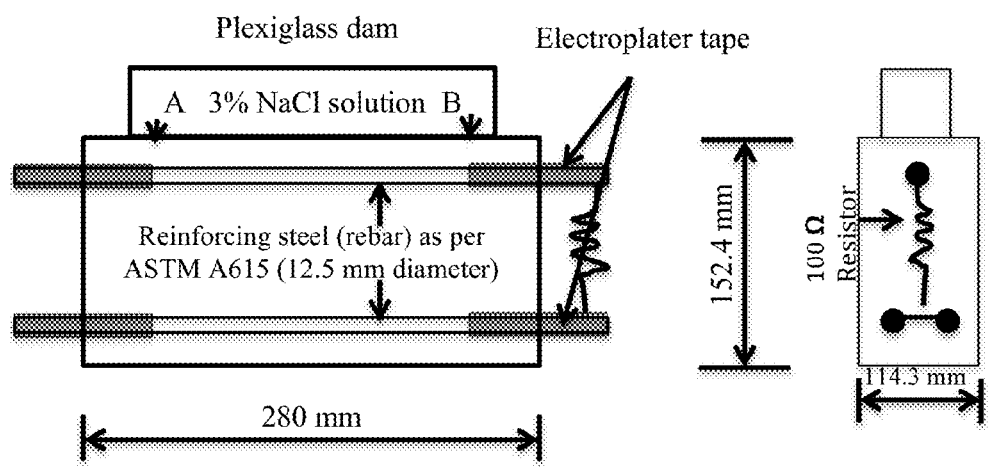
FIG. 7 schematically illustrates a corrosion test according to ASTM G109.

Prismatic specimens of size 11 in.×6 in.×4.5 in (280 mm×150 mm×115 mm) were cast as per ASTM G109 using mixture proportions shown in Table 3. Each specimen uses two layers of reinforcement as shown in FIG. 7. Corrosion test specimens were reacted in the autoclave as per curing procedure described earlier. The minimum of 2 specimens was used for each set of test. The top layer of the prismatic specimen consists of one reinforcing bar with a 0.75 in. (19 mm) concrete cover and the bottom layer consists of two bars. The two layers of reinforcement are electrically connected with a 100-ohm resistor. The prismatic specimens were ponded with a 3% (by wt.) sodium chloride solution for 4 days and kept dry for 3 days; these cycles were continued until a predefined amount of charge was measured between the top and bottom reinforcing bars. The macrocell corrosion current and the half-cell potential (HCP) values (versus copper-copper sulfate electrode [CSE]) of the bars were monitored.

The HCP was measured at two locations, A and B, as shown in FIG. 7 for top and bottom rebar and average of two numbers was considered as HCP value for respective rebar.

Corrosion of Steel

The measured HCP values on corrosion specimens were more than −650 mV for both top and bottom rebar, which indicated much higher level of corrosion activity in plain carbon steel reinforcement. The HCP values of more negative than −350 mV, indicating more than 90% probability of corrosion, as per the standard.

In the case of post-tensioned RRTs of the invention, the ducts were grouted with high pH material protective for reinforcement and hence beneficial condition for RRTs of the invention. Plain carbon steel coated with Portland cement mortar were used for corrosion test in the second phase of the study. The HCP values were much lower about −250 mV for these specimens, indicating no corrosion activity for the tested duration of 100 days.

Abrasion Resistance

Abrasion resistance testing on samples cut from the cured ceramic body was performed at CESARE Inc. Colorado, as per the ASTM C779 Procedure C. This is the test for abrasion resistance in reference to railroad tie materials. The abrasion index results were 606, 588 and 526 minutes/inch for different batches. Poor concrete exhibits abrasion index values of 0-200 min/inch range and excellent concrete samples yield results greater than 350 min/inch. Therefore, RRTs of the invention have excellent abrasion resistance for railroad tie application.

In this specification and the appended claims, the singular forms "a," "an," and "the" include plural reference, unless the context clearly dictates otherwise.

Unless defined otherwise, all technical and scientific terms used herein have the same meaning as commonly understood by one of ordinary skill in the art. Although any methods and materials similar or equivalent to those described herein can also be used in the practice or testing of the present disclosure, the preferred methods and materials are now described. Methods recited herein may be carried out in any order that is logically possible, in addition to a particular order disclosed.

INCORPORATION BY REFERENCE

References and citations to other documents, such as patents, patent applications, patent publications, journals, books, papers, web contents, have been made in this disclosure. All such documents are hereby incorporated herein by reference in their entirety for all purposes. Any material, or portion thereof, that is said to be incorporated by reference herein, but which conflicts with existing definitions, statements, or other disclosure material explicitly set forth herein is only incorporated to the extent that no conflict arises between that incorporated material and the present disclosure material. In the event of a conflict, the conflict is to be resolved in favor of the present disclosure as the preferred disclosure.

EQUIVALENTS

The representative examples disclosed herein are intended to help illustrate the invention, and are not intended to, nor should they be construed to, limit the scope of the invention. Indeed, various modifications of the invention and many further embodiments thereof, in addition to those shown and described herein, will become apparent to those skilled in the art from the full contents of this document, including the examples which follow and the references to the scientific and patent literature cited herein. The following examples contain important additional information, exemplification and guidance that can be adapted to the practice of this invention in its various embodiments and equivalents thereof.

What is claimed is:

1. A railroad tie having an elongated tie body prepared from a composite material comprising:
   a plurality of bonding elements, wherein each bonding element comprises: a core comprising primarily calcium silicate, a silica-rich first or inner layer, and a calcium carbonate-rich second or outer layer; and
   filler particles comprising coarse filler particles and/or fine filler particles, wherein the plurality of bonding elements and the plurality of filler particles together form one or more bonding matrices and the bonding elements and the filler particles are substantially evenly dispersed therein and bonded together,
   wherein
   the composite material is characterized by a density from about $1900 \, kg/m^3$ to $2800 \, kg/m^3$, a compressive strength from about 40 MPa to about 100 MPa, and a flexural strength from about 4 MPa to about 10 MPa,
   the railroad tie is characterized by an improved abrasion resistance over conventional concrete railroad ties and an abrasion index greater than 350 min/inch,
   the elongated tie body has one or more longitudinally disposed ducts wherein one or more reinforcement steel bars are placed respectively, and
   the steel reinforcement bars interface with the tie body via a protective coating of epoxy or zinc on the steel reinforcement bars.

2. A railroad tie having an elongated tie body prepared from a composite material comprising:
   a plurality of bonding elements, wherein each bonding element comprises: a core comprising primarily calcium silicate, a silica-rich first or inner layer, and a calcium carbonate-rich second or outer layer; and
   filler particles comprising coarse filler particles and/or fine filler particles, wherein the plurality of bonding elements and the plurality of filler particles together form one or more bonding matrices and the bonding elements and the filler particles are substantially evenly dispersed therein and bonded together,
   wherein
   the composite material is characterized by a density from about $1900 \, kg/m^3$ to $2800 \, kg/m^3$, a compressive strength from about 40 MPa to about 100 MPa, and a flexural strength from about 4 MPa to about 10 MPa,
   the railroad tie is characterized by an improved abrasion resistance over conventional concrete railroad ties and an abrasion index greater than 350 min/inch,
   the elongated tie body has one or more longitudinally disposed ducts wherein one or more reinforcement steel bars are placed respectively, and
   the railroad tie is pre-stressed.

3. A railroad tie having an elongated tie body prepared from a composite material comprising:
   a plurality of bonding elements, wherein each bonding element comprises: a core comprising primarily calcium silicate, a silica-rich first or inner layer, and a calcium carbonate-rich second or outer layer; and
   filler particles comprising coarse filler particles and/or fine filler particles, wherein the plurality of bonding elements and the plurality of filler particles together form one or more bonding matrices and the bonding elements and the filler particles are substantially evenly dispersed therein and bonded together,
   wherein
   the composite material is characterized by a density from about $1900 \, kg/m^3$ to $2800 \, kg/m^3$, a compressive strength from about 40 MPa to about 100 MPa, and a flexural strength from about 4 MPa to about 10 MPa,
   the railroad tie is characterized by an improved abrasion resistance over conventional concrete railroad ties and an abrasion index greater than 350 min/inch,
   the elongated tie body has one or more longitudinally disposed ducts wherein one or more reinforcement steel bars are placed respectively, and
   the railroad tie is post-tensioned.

* * * * *